(12) United States Patent
Onaka et al.

(10) Patent No.: US 7,127,139 B2
(45) Date of Patent: Oct. 24, 2006

(54) OPTICAL MULTIPLEXING METHOD AND OPTICAL MULTIPLEXER, AND OPTICAL AMPLIFIER USING SAME

(75) Inventors: Miki Onaka, Kawasaki (JP); Etsuko Hayashi, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 10/878,619

(22) Filed: Jun. 29, 2004

(65) Prior Publication Data

US 2005/0185885 A1 Aug. 25, 2005

(30) Foreign Application Priority Data

Feb. 24, 2004 (JP) .............................. 2004-047739

(51) Int. Cl.
*G02B 6/34* (2006.01)
(52) U.S. Cl. .................... 385/37; 385/24; 359/341.1
(58) Field of Classification Search .................... None
See application file for complete search history.

(56) References Cited

U.S. PATENT DOCUMENTS

| | | | |
|---|---|---|---|
| 4,776,661 A | 10/1988 | Handa | |
| 5,042,897 A | 8/1991 | Meltz | |
| 5,061,032 A | 10/1991 | Meltz et al. | |
| 5,307,437 A | 4/1994 | Facq et al. | |
| 5,703,978 A * | 12/1997 | DiGiovanni et al. | 385/37 |
| 5,982,962 A | 11/1999 | Koops et al. | |
| 6,243,515 B1 * | 6/2001 | Heflinger et al. | 385/37 |
| 6,516,118 B1 * | 2/2003 | Brilland et al. | 385/37 |
| 6,904,198 B1 * | 6/2005 | Dykaar | 385/31 |
| 2001/0046352 A1* | 11/2001 | Ohta et al. | 385/50 |

FOREIGN PATENT DOCUMENTS

| | | |
|---|---|---|
| EP | 0438759 A | 7/1991 |
| FR | 2674639 A | 10/1992 |
| JP | 08-171031 | 7/1996 |
| JP | 2000-180646 | 6/2000 |
| JP | 2001-516468 | 9/2001 |

OTHER PUBLICATIONS

EP Search Report for corresponding EP Application No. 04015172.2-2222- dated Apr. 13, 2005.

(Continued)

*Primary Examiner*—Rodney Bovernick
*Assistant Examiner*—Mike Stahl
(74) *Attorney, Agent, or Firm*—Staas & Halsey LLP

(57) ABSTRACT

An object of the invention is to provide an optical multiplexing method and an optical multiplexer, capable of fixing lights of different wavelengths at required wavelengths to stably multiplex them with a simple optical circuit configuration. To this end, in the present optical multiplexer, there is provided a tilted FBG, which is formed on an optical fiber through which a first light is propagated, with a grating direction thereof being tilted to an axial direction of the optical fiber, and has the sufficiently high reflectance to a second light (multiplexed light) of a wavelength different from that of the first light. The multiplexed light emitted from a light source is irradiated to the tilted FBG, via a free space from an angle direction determined according to a grating pitch of the tilted FBG and the wavelength of the multiplexed light, to be coupled within the optical fiber. Further, a low reflective FBG reflecting light coupled within the optical fiber is formed on the optical fiber, to achieve a resonance structure between the low reflective FBG and the light source, thereby stabling the wavelength of the multiplexed light.

20 Claims, 35 Drawing Sheets

OTHER PUBLICATIONS

C.K. Madsen et al., "Planar Waveguide Optical Spectrum Analyzer Using a UV-Induced Grating", IEEE Journal of Selected Topics In Quantum Electronics, vol. 4., No. 6, Nov./Dec. 1998, pp. 925-929.

J.L. Wagener, et al., "Fiber Grating Optical Spectrum Analyzer Tap", ECOC 97, Sep. 22-25, 1997, Conference Publications No. 448, IEE, 1997, pp. 65-068.

A. Niwa, et al., "Gain Equalizer Using Slanted Fiber Bragg Grating", Fujikura Technical Review, vol. 103, Oct. 2002, pp. 1-4.

T. Komokai et al., "Recent Progress in Optical Fiber Bragg Gratings", Technical Report of IEICE, Dec. 1995, pp. 19-24.

* cited by examiner

FIG.21
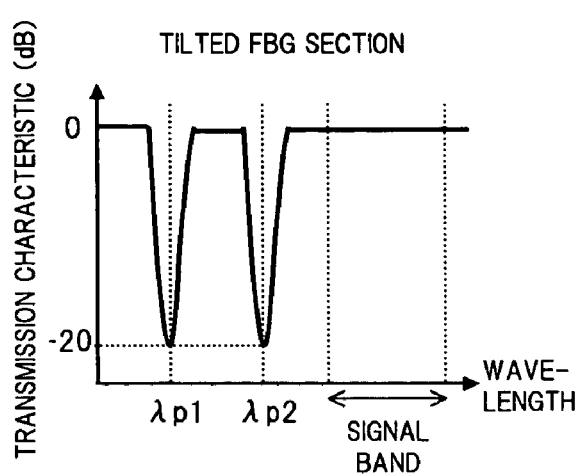
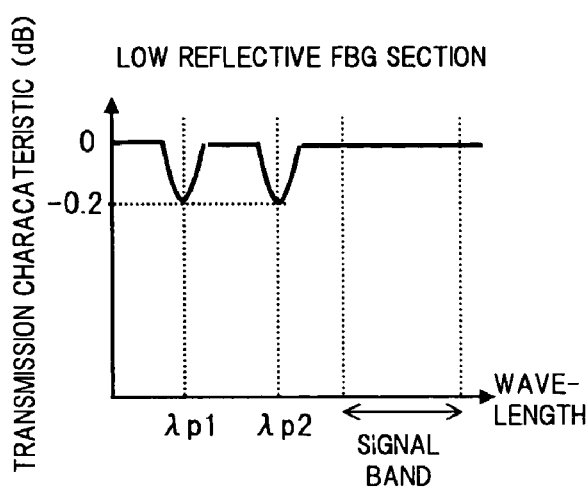

OPTICAL MULTIPLEXING METHOD AND OPTICAL MULTIPLEXER, AND OPTICAL AMPLIFIER USING SAME

BACKGROUND OF THE INVENTION

1. Field of the Invention

The present invention relates to an optical multiplexing method and an optical multiplexer, for multiplexing lights of different wavelengths which are utilized in various optical communication systems, and an optical amplifier using the same. In particular, the present invention relates to a technique for realizing the multiplexing of lights with a simple optical circuit configuration.

2. Related Art

An optical amplifier is one of key components realizing the long distance and large capacity of optical communication system. Types of optical amplifier are classified into a laser amplifier using stimulated emission from a population inversion medium, and an amplifier based on a nonlinear optical effect such as Raman scattering or Brillouin scattering. As the laser amplifier, there are a rare earth element doped fiber amplifier and a semiconductor laser amplifier using a semiconductor amplification medium, the former being operated with the photo excitation and the latter being operated with the inlet current excitation. Among these optical amplifiers, the rare earth element doped fiber amplifier has a high advantage in performance, for example, bit rate free, high gain, low noise, broad band, low coupling loss, low polarization dependence, high efficiency and the like. Among the rare earth element doped fiber amplifiers, an erbium (Er) doped fiber amplifier (to be referred to as EDFA herebelow) is typical, and is now in practical use in optical fiber communication systems. The performance (gain, NF) and cost of such an optical amplifier for optical communication represented by EDFA and the like are key factors of optical communication systems, and it is important how the reduction of cost is achieved while maintaining the required performance.

The cost required for a pumping light source and a multiplexing system thereof constitutes a large proportion of the cost of optical amplifier for optical communication. As one of means for achieving the cost reduction of pumping light source, there has been known a technique in which a low cost semiconductor laser (LD) for commercial-off-the-shelf (for example, DVD or CD-R) is adopted (refer to Japanese Unexamined Patent Publication No. 6-318750).

However, in order to make it possible to apply an optical amplifier using a pumping light source which is at low cost although having less reliability, as the optical amplifier for optical communication in which the strict reliability (duration of life) is required, it becomes important to improve the reliability up to a predetermined value while keeping a cost merit.

As one method for improving the reliability of pumping light source utilizing low cost LD, it is effective to adopt a redundant configuration improving the reliability up to a predetermined level by applying multiple pumping LDs, although such an LD has less reliability when used in a simple body. In the redundant configuration of known optical amplifier, even if the unit cost of pumping LD is low, the cost required for optical components of multiplexing system corresponding to the redundant configuration is high. Therefore, it is difficult to expect the cost-reduction of the whole optical amplifier. Specifically, with an increase of the number of pumping LDs, the cost is increased due to the addition of high-cost optical multiplexer (including an increase of assembly cost with the increase of the number of components), and also required output power of single pumping LD is increased due to an increase of insertion loss. Therefore, it is desirable that the number of components of multiplexing system can be reduced to realize the low cost.

As conventional techniques for multiplexing lights of different wavelengths, there has been proposed a technique multiplexing light utilizing a tilted grating (refer to Japanese Unexamined Patent Publication No. 8-171031 and Japanese National Patent Publication No. 2001-516468). The tilted grating is formed such that a direction of grating (a direction perpendicular to a plane where the rise of refractive index occurs) is tilted to an axial direction of optical path of an optical fiber, optical waveguide or the like, and is sometimes called a slanted grating.

Specifically, Japanese Unexamined Patent Publication No. 8-171031 discloses an optical apparatus in which a grating coupler is disposed in a waveguide arranged on a silicon substrate on which a photodiode is formed, a semiconductor laser and an optical fiber are disposed on positions opposite to the grating coupler, a transmission light emitted from the semiconductor laser is incident on the grating coupler at an incident angle of 45° and totally reflected by the grating coupler, to be sent to the optical fiber, and also a reception light of a wavelength different to that of the transmission light is output from the optical fiber to be incident on the grating coupler at an incident angle of 45°, and excited in the waveguide by the grating coupler, to be received by the photodiode. Further, Japanese National Patent Publication No. 2001-516468 discloses an optical apparatus in which a lens is formed on a cladding surface of an optical fiber, on which is written with titled fiber Bragg grating (FBG), to be coupled with the FBG, and a light guided in the optical fiber via the lens is reflected by the tilted FBG, to be guided into the core.

The optical multiplexing method using the tilted grating as described above is considered to be one of techniques effective for reducing the number of components of pumping light multiplexing system in the optical amplifier, since lights of a plurality of wavelengths can be multiplexed with a simple configuration, compared with the case where a plurality of pumping lights is multiplexed sequentially in a three using WDM couplers, polarization combining devices and the like in a pumping system of the optical amplifier (for example, refer to FIG. 18).

However, in the case where the conventional optical multiplexing technique using the tilted grating described above is applied to the pumping light multiplexing system of the optical amplifier, there is caused the following problem. Namely, when the optical multiplexing technique disclosed in Japanese Unexamined Patent Publication No. 8-171031 is applied to the optical amplifier, the pumping lights are multiplexed by means of a bulk type grating formed on the waveguide. The amplification medium used in the optical amplifier such as EDFA and the like is typically of a fiber type, and a combination thereof with the bulk type grating has a possibility of an increase of insertion loss to increase required output power of a simple pumping LD. Therefore, such a combination is not necessarily effective for the cost reduction.

Further, in the case where the optical multiplexing technique disclosed in Japanese National Publication No. 2001-516468 is applied to the optical amplifier, the pumping light is introduced into the tilted grating formed in the optical fiber via the external optical fiber and the lens. Therefore, the optical circuit configuration for introducing the pumping light into such a tilted grating becomes complicated, leading a possibility of a drop of the reduction effect of the number of components by the utilization of tilted grating.

Moreover, in the above described conventional optical multiplexing technique, it is necessary to coincide high accurately the wavelengths of lights to be multiplexed with the reflective wavelength of the tilted grating, in order to obtain the high coupling efficiency. However, since the output wavelengths of the pumping light source and the reflective wavelength of the tilted grating are changed due to external factors, such as individual differences between components or a temperature variation, it becomes difficult to obtain required pumping light power. Further, in order to stably operate the optical amplifier, a function for fixing the wavelengths of the pumping lights to be multiplexed is demanded. However, the realization of such a function leads the increase of number of components and an increase of cost.

SUMMARY OF THE INVENTION

The present invention has been accomplished in view of the aforementioned problems, with an object of realizing an optical multiplexing method and an optical multiplexer, which can fix lights of different wavelengths at required wavelengths to stably multiplex them with a simple optical circuit configuration utilizing a fiber Bragg grating. Further, the present invention has an object to provide an optical amplifier in which the optical multiplexer is used for constituting a pumping light multiplexing system, to achieve the reduction of number of components and the cost reduction.

In order to achieve the above objects, in an optical multiplexing method according to the present invention, in which a first light being propagated through an optical fiber is multiplexed with a second light of a wavelength different from that of the first light, the second light given from the outside of the optical fiber is irradiated to a first fiber Bragg grating, which has transmission wavelength characteristics to transmit the first light and to reflect the second light, and is formed on the optical fiber with a grating direction thereof being tilted to an axial direction of the optical fiber, via a free space from an angle direction determined according to a grating pitch of the first fiber Bragg grating and the wavelength of the second light, and the second light reflected by the first fiber Bragg grating is coupled within the optical fiber.

One aspect of the optical multiplexer of the present invention, in which a first light being propagated through an optical fiber is multiplexed with a second light of a wavelength different from that of the first light, comprises a first fiber Bragg grating, which has transmission wavelength characteristics to transmit the first light and to reflect the second light, and is formed on the optical fiber with a grating direction thereof being tilted to an axial direction of the optical fiber, wherein the second light given from the outside of the optical fiber is irradiated to the first fiber Bragg grating via a free space from an angle direction determined according to a grating pitch of the first fiber Bragg grating and the wavelength of the second light, and the second light reflected by the first fiber Bragg grating is coupled within the optical fiber.

According to the optical multiplexing method and the optical multiplexer of the above configuration, the second light is irradiated to the tilted first fiber Bragg grating via the free space from the outside of the optical fiber through which the first light is propagated. Since an incident angle of the second light to the first fiber Bragg grating is determined according to the grating pitch of the first fiber Bragg grating and the wavelength of the second light, the second light incident on the first fiber Bragg grating is reflected at the high reflectance, to be coupled within the optical fiber at the high coupling efficiency. As a result, the first and second lights are multiplexed with a simple configuration using the tilted fiber Bragg grating, and therefore, it becomes possible to reduce the number of components of the optical multiplexer and the cost.

Another aspect of the optical multiplexer of the present invention, in which a first light being propagated through an optical fiber is multiplexed with a second light of a wavelength different from that of the first light, comprises: a first fiber Bragg grating, which has transmission wavelength characteristics to transmit the first light and to reflect the second light, and is formed on the optical fiber with a grating direction thereof being tilted to an axial direction of the optical fiber; a light source irradiating lights containing a wavelength component of the second light to the first fiber Bragg grating from an angle direction determined according to a grating pitch of the first fiber Bragg grating and the wavelength of the second light; and a second fiber Bragg grating, which has the reflectance lower than that of the first fiber Bragg grating to the second light, and has a grating plane perpendicular to the axial direction of the optical fiber, and is formed on the optical fiber on the side where the second light irradiated from the light source to the first fiber Bragg grating and coupled within the optical fiber is propagated, wherein the second light is resonated between the light source and the second fiber Bragg grating via the first fiber Bragg grating.

According to the optical multiplexer of the above configuration, the emitted lights from the light source are irradiated to the first fiber Bragg grating to be reflected, and a part of the second light coupled within the optical fiber is reflected by the second fiber Bragg grating having the low reflectance formed on the optical fiber, to be resonated between the light source and the second fiber Bragg grating. As a result, the wavelengths of the lights that are multiplexed via the first fiber Bragg grating are fixed at a reflective wavelength of the second fiber Bragg grating.

An optical amplifier of the present invention is applied with the optical multiplexing configuration according to the present invention as a multiplexing system of pumping lights to be supplied to an amplification medium.

Other objects, features and advantages of the present invention will become clear from the following description of the embodiments, in conjunction with the appended drawings.

BRIEF DESCRIPTION OF THE DRAWINGS

FIG. 21 is a diagram showing one example of transmission wavelength characteristics of a tilted FBG section and a low reflectance FBG section in the rare earth element doped fiber amplifier of FIG. 20.

DETAILED DESCRIPTION OF THE INVENTION

Hereunder is a description of embodiments of the present invention with reference to the drawings. The same reference symbols are used to the same or similar parts throughout all the drawings.

Figure 1:
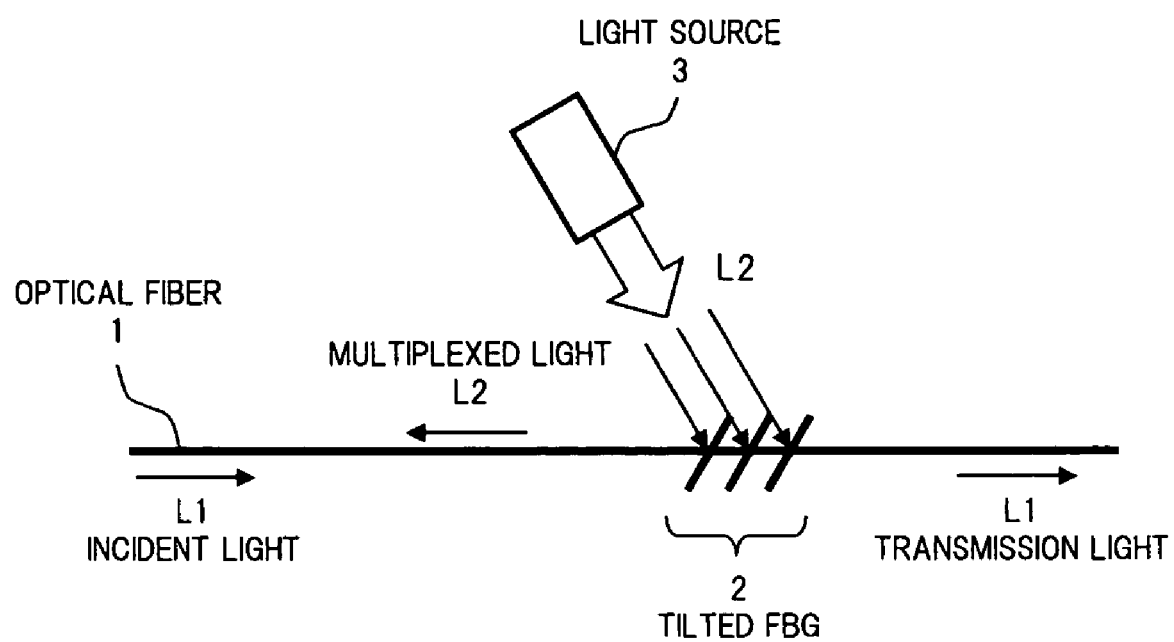
FIG. 1 is a block diagram showing one embodiment of an optical multiplexer according to the present invention.

FIG. 1 is a block diagram showing one embodiment of an optical multiplexer according to the present invention.

In FIG. 1, the optical multiplexer in the present embodiment, in which a light L1 of a wavelength $\lambda 1$ being propagated through an optical fiber 1 is multiplexed with a light L2 of a wavelength $\lambda 2$ different from the wavelength of the light L1, is provided with a tilted fiber Bragg grating (tilted FBG) 2, which has the sufficiently high reflectance to the light L2 of the wavelength $\lambda 2$, and is formed on the optical fiber 1 with a grating direction thereof being tilted to an axial direction of the optical fiber 1. The light L2 of the wavelength $\lambda 2$ given from the outside of the optical fiber 1 passes through a free space from a direction of angle $\theta_0$ determined according to a grating pitch (period) P of the tilted FBG 2 and the wavelength $\lambda 2$, to be directly irradiated to the tilted FBG 2. Here, a light source 3 generating the light L2 of the wavelength $\lambda 2$ is arranged along the direction of angle $\theta_0$ relative to the tilted FBG 2, and the light L2 emitted from the light source 3 is directly irradiated to the tilted FBG 2 without passing through any optical fiber or the like.

Figure 2:
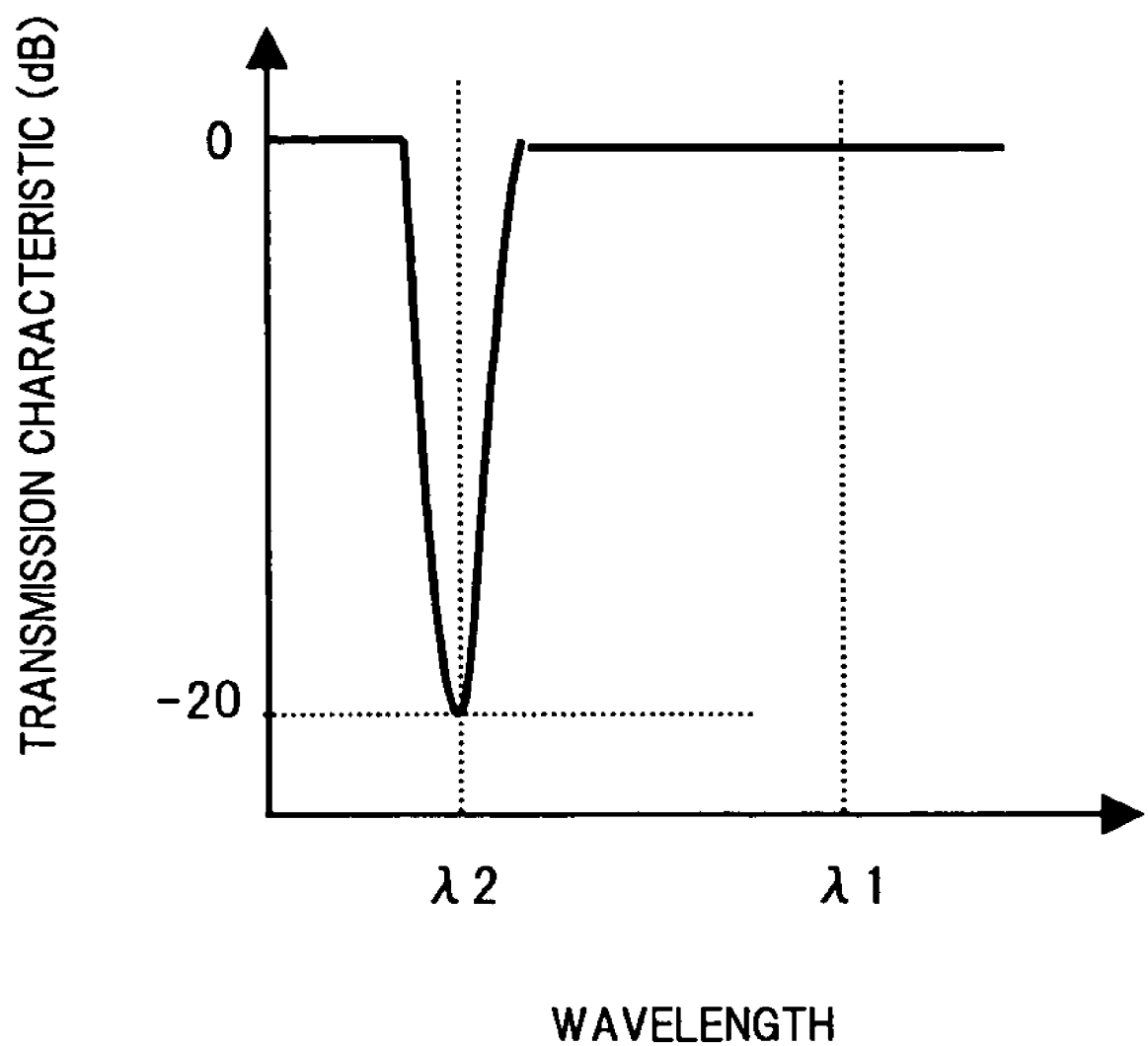
FIG. 2 is a diagram showing one example of transmission wavelength characteristics of a tilted FBG used in the optical multiplexer in FIG. 1.
Figure 3:
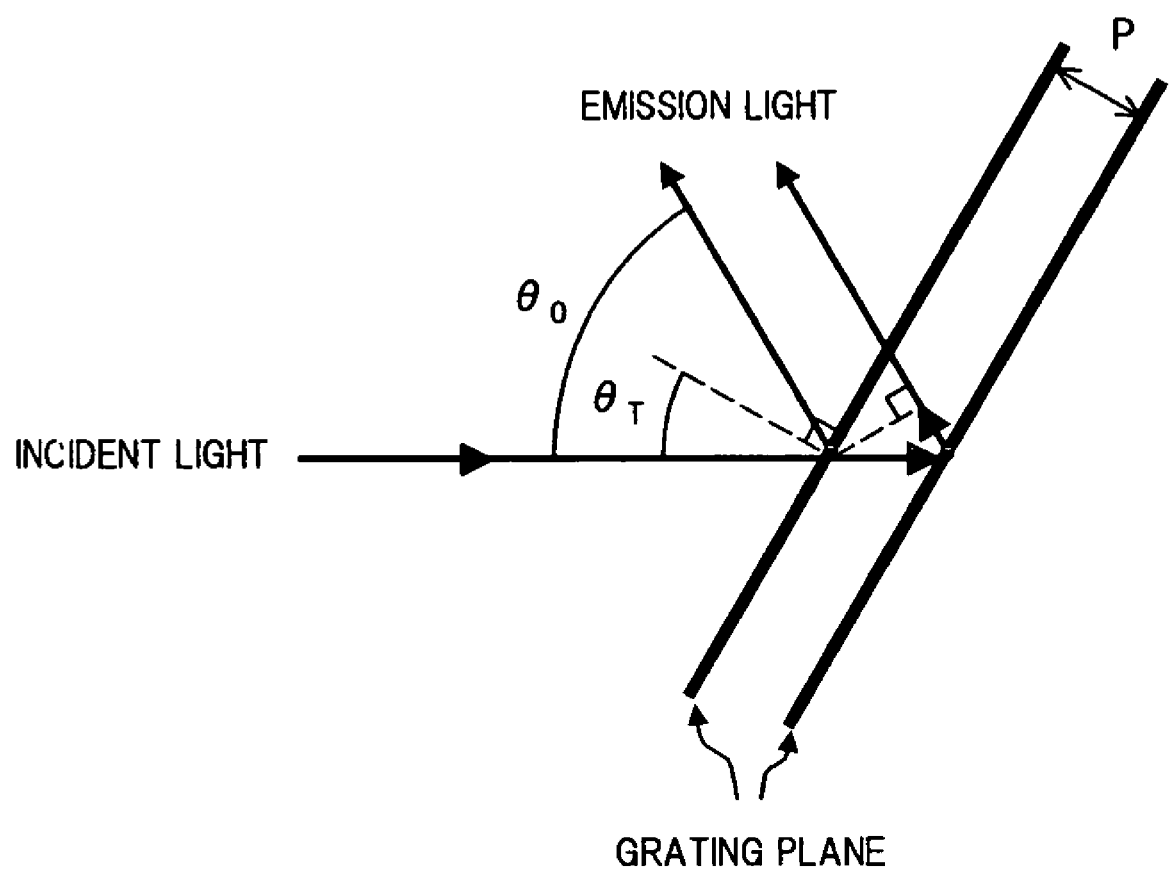
FIG. 3 is a diagram for explaining radiation angles of reflected lights and pitches of grating planes in the tilted FBG.

The tilted FBG 2 is structured such that a Bragg grating, which is designed with the total length L and the pitch (period) P, and the refractive index amplitude $\Delta n$ so as to obtain the sufficiently high reflectance (ideally, the reflectance of 100%) to the light L2 of the wavelength $\lambda 2$, is formed in a predetermined range along a longitudinal direction of the optical fiber 1 including a core and a cladding. A direction of this grating, that is, a direction perpendicular to a plane where the rise of refractive index occurs, is tilted to the axial direction of the optical fiber 1, so that the reflected light of the wavelength $\lambda 2$ is coupled to a backward cladding mode. Note, the tilted FBG 2 has the transmittance of approximately 100% to the light L1 of the wavelength $\lambda 1$ which is propagated through the optical fiber 1. FIG. 2 is one example of transmission wavelength characteristics of the tilted FBG 2.

Here, the detailed description will be made on a basic characteristic of the tilted fiber Bragg grating.

At first, the fiber grating is typically a Bragg grating formed on an optical fiber using a change in refractive index due to the ultraviolet light induction by the core of the optical fiber, and functions as a reflective filter reflecting (or rejecting) only a light of Bragg wavelength. Further, in the fiber grating, by forming grating layers of the tens of thousands in the longitudinal direction of the optical fiber, it is possible to realize a sharp spectrum characteristic in which the reflectance (or transmittance) is abruptly changed with respect to the wavelength.

Specifically, the Bragg reflective wavelength $\lambda_B$ of the fiber grating is represented by the following equation (1) using the actual refractive index n to the propagation mode of the optical fiber and the grating pitch P.

$$\lambda_B = 2nP \quad (1)$$

Further, the bandwidth $\Delta\lambda_B$ of reflection spectrum is represented by the equation (2) using the grating length L and the amplitude $\Delta n$ of refractive index modulation.

$$\Delta\lambda_B = \{\lambda_B^2/(\pi nL)\} \times \{\pi^2 + (\pi \Delta n L/\lambda_B)^2\}^{1/2} \quad (2)$$

The grating reflectance $R_B$ is represented by the equation (3) using a ratio $\gamma$ of propagated light energy contained in a core region.

$$R_B = \tan h^2(\pi L \Delta n \gamma/\lambda_B) \quad (3)$$

The fiber grating as described above is applied to be in practical use, in a wide range, for a dispersion compensation fiber, a tunable optical filter, a gain equalizer and the like, by controlling various design parameters thereof, such as, the grating pitch P, the grating length L and the like, due to the features of fiber type optical components (low loss, good coupling performance to an optical line) and the excellent reflection spectrum characteristic.

In addition, application examples of the fiber grating to an optical spectrum monitor, a gain equalizer and the like have been reported, since not only the light of a particular wavelength is reflected to an incident direction but also the reflected light can be emitted into a cladding region by manufacturing the grating to be tilted to the axial direction of the optical fiber, and the light coupled to the backward cladding mode is emitted to the outside of the optical fiber (refer to C. K. Madsen et al., "Planar Waveguide Optical Spectrum Analyzer Using a UV-Induced Grating", IEEE JOURNAL OF SELECTED TOPICS IN QUANTUM ELECTRONICS, Vol. 4, No. 6, November/December 1998, 925 to 929; Jefferson L. Wagener et al., "Fiber Grating Optical Spectrum Analyzer Tap", ECOC, 1997, 65 to 68, postedadlline paper V. 5; and Tetsuro Omukai et al., "Recent Development of Optical Fiber Grating Technology", TECHNICAL REPORT OF IEICE OPE95-114 (1995-12)).

In the embodiment of the optical multiplexer of the present invention shown in FIG. 1, the multiplexing of the lights L1 and L2 of the wavelengths $\lambda 1$ and $\lambda 2$ different to each other is realized with a simple configuration by utilizing a spectral characteristic of the tilted FBG as described above. Therefore, (A) the improvement of high coupling efficiency of the multiplexed light and (B) the optimization of reflective wavelength characteristic of the tilted FBG become main technical points.

(A) Improvement of High Coupling Efficiency of Multiplexed Light

In order to suppress the cost of the light source 3 generating the multiplexed light to be low and keep the reliability high, it is demanded to improve the coupling efficiency of the multiplexed light, specifically, it becomes important to increase the reflectance of the multiplexed light in the tilted FBG 2 as high as possible. In order to realize the high reflectance, it is understood from the equation (3) that the grating length L and the amplitude $\Delta n$ of the refractive index modulation may be increased. As a measure to increase the amplitude $\Delta n$ of the refractive index modulation, there is a method for enriching germanium (Ge) which is doped in order to rise the refractive index of the core in the optical fiber 1, a method for performing the hydrogenation process on the optical fiber 1 or the like. By applying such a method, it becomes possible to realize the fiber grating having the reflectance of 90% or above. Further, the reflectance of the tilted FBG 2 is also changed depending on the angle of the grating direction relative to the axial direction of the optical fiber 1, as described later. Therefore, it becomes important to optimize an incident angle of the light L2 of the wavelength $\lambda 2$, which is incident on the tilted FBG 2. The details of an optimum incident angle of the multiplexed light L2 will be described later.

(B) Optimization of the Reflective Wavelength Characteristic of the Tilted FBG

In order to enable the realization of multiplexing of the lights L1 and L2 of the wavelengths $\lambda 1$ and $\lambda 2$ different to each other, it becomes necessary to perform the designing such that the reflective wavelength characteristic of the tilted FBG 2 has a desired narrow band characteristic (required minimum band) in the wavelength $\lambda 2$. Specifically, the reflective wavelength characteristic of the tilted FBG 2 is optimized using the relational formula shown in the following.

It is known that the reflective wavelength $\lambda_B'$ of the tilted FBG 2 in vacuum is shifted to a shorter wavelength side by a cladding mode effective refractive index difference relative to the Bragg reflective wavelength $\lambda_B$ shown in the equation (1) (the case where the grating direction is perpendicular to the axial direction of the optical fiber), and therefore, it is represented by the following equation (4) using the effective refractive index $n_{core}$ of the core and the effective refractive index $n_{clad}$ of the cladding in the optical fiber 1.

$$\lambda_B' = P(2 \cdot n_{core} \cdot n_{clad}) \quad (4)$$

Further, it is known that a relationship between the reflective wavelength $\lambda_B'$ of the tilted FBG 2, and an emission angle $\theta_0$ of the reflected light and an inclination $\theta_T$ of the grating plane is represented by the following equation (5).

$$\lambda_B' = \lambda_B(1 + \cos\theta_0)/2\cos\theta_T \quad (5)$$

It is understood from the relationship of the equation (4) and the equation (5) that the emission angle $\theta_0$ of the emitted light, in other words, the incident angle $\theta_0$ of the multiplexed light L2 relative to the tilted FBG 2 is determined according to the reflective wavelength $\lambda_B'$ and the grating pitch P. In the case where the reflective wavelength $\lambda_B'$ is fixed at $\lambda 2$, the grating pitch corresponding thereto is determined based on the equation (4), and further, the optimum incident angle $\theta_0$ corresponding to the wavelength $\lambda 2$ and the grating pitch P is determined based on the equation (5). Accordingly, the tilted FBG 2 having this grating pitch P is formed on the optical fiber 1, and the light source 3 is arranged so as to be coincident with a direction of the incident angle $\theta_0$, so that the optimum reflective wavelength characteristic of the tilted FBG corresponding to the wavelength λ2 of the multiplexed light L2 is realized.

As described in the above, according to one embodiment of the optical multiplexer shown in FIG. 1, the arrangement of the grating pitch P and the light source 3 is designed corresponding to the wavelength λ2 of the multiplexed light L2, so that the sufficiently high reflectance can obtained, and at the same time the optimum reflective wavelength characteristic can realized. As a result, the light L2 of the wavelength λ2 emitted from the light source 3 is directly irradiated to the tilted FBG 2 without passing though the optical system such as optical fiber or the like, to be multiplexed with the light L1 of the wavelength λ1, which is propagated through the optical fiber 1. In such an optical multiplexer, the number of components can be reduced, compared with the conventional configuration. Further, the tilted FBG 2 has the fiber configuration. Therefore, in the case where the tilted FBG 2 is used as a pumping light multiplexing system of an optical amplifier, it becomes possible to easily realize the good coupling to a fiber type amplification medium.

Figure 4:
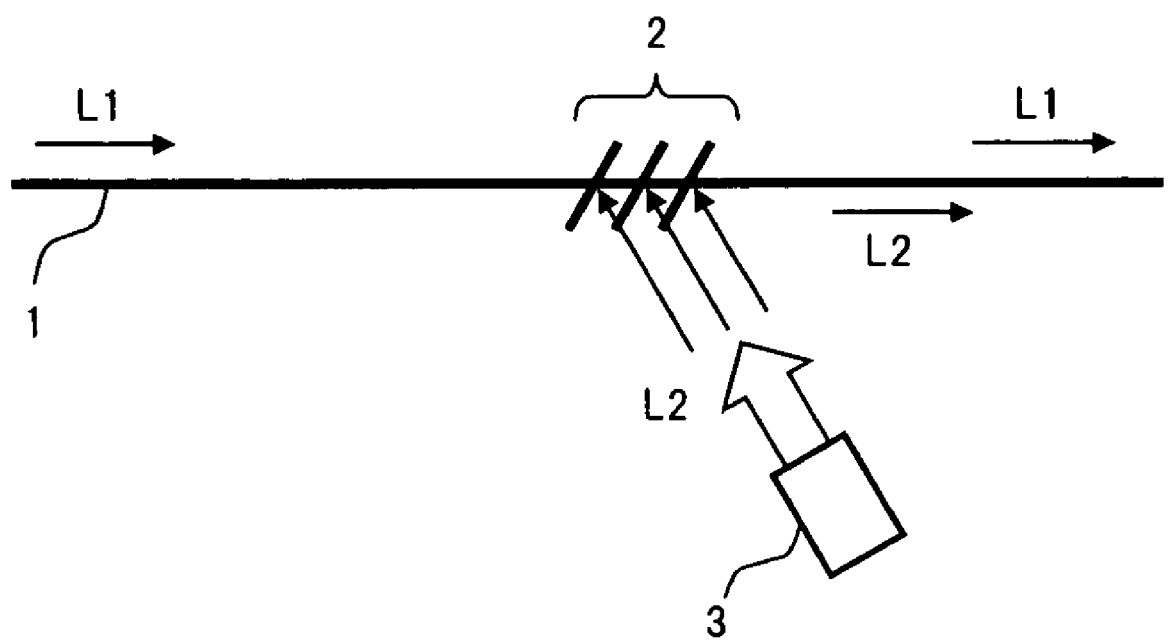
FIG. 4 is a diagram showing another configuration example related to the optical multiplexer in FIG. 1.

In the configuration shown in FIG. 1, one example has been shown in which a propagation direction in the optical fiber 1 of the light L2 of the wavelength λ2 to be multiplexed is opposite to a propagation direction of the light L1 of the wavelength λ1. However, the present invention is not limited thereto, and as shown in FIG. 4 for example, by changing the incident direction of the light L2 of the wavelength λ2 on the tilted FBG 2 to an opposite direction, it becomes also possible to make the propagation directions of the light L1 of the wavelength λ1 and the light L2 of the wavelength λ2 in the optical fiber 1 same.

Moreover, since it has been known that the polarization dependence occurs in the tilted FBG 2, it is necessary to pay an attention in the case where the tilted FBG 2 is used for the multiplying of signal lights. Specifically, if the inclination of the grating direction to the axial direction of the optical fiber 1 is increased, the polarization dependence is also increased. Therefore, it is demanded to perform the designing taking into consideration of an influence by the polarization dependence of the tilted FBG 2 on transmission characteristics of signal lights. However, in the case where the titled FBG 2 is used for the multiplexing of pumping lights in the optical amplifier, the polarization dependence of the tilted FBG 2 does not directly influence on the transmission characteristics of signal lights as in the case of the multiplexing of signal lights, but influences as the polarization dependence of optical amplification characteristic due to the polarization dependence of pumping light. Therefore, it may be considered that the influence on the transmission characteristic of signal lights by the polarization dependence of the tilted FBG 2 can be neglected.

Furthermore, it has been reported that the light returned to the core from the cladding slightly exists in the emission light of the tilted FBG, and an output variation (ripple) at about 0.2 Bpp is observed. With regard to this, there is a possibility that the coupling efficiency of the multiplexed light is varied also in the present invention. To such a possibility of the coupling efficiency variation, it is desirable to form the structure such that the periphery of cladding of the optical fiber 1 is covered with a material (for example, resin) having the refractive index approximately the same as that of the cladding.

Next, another embodiment of the optical multiplexer according to the present invention will be described.

Figure 5:
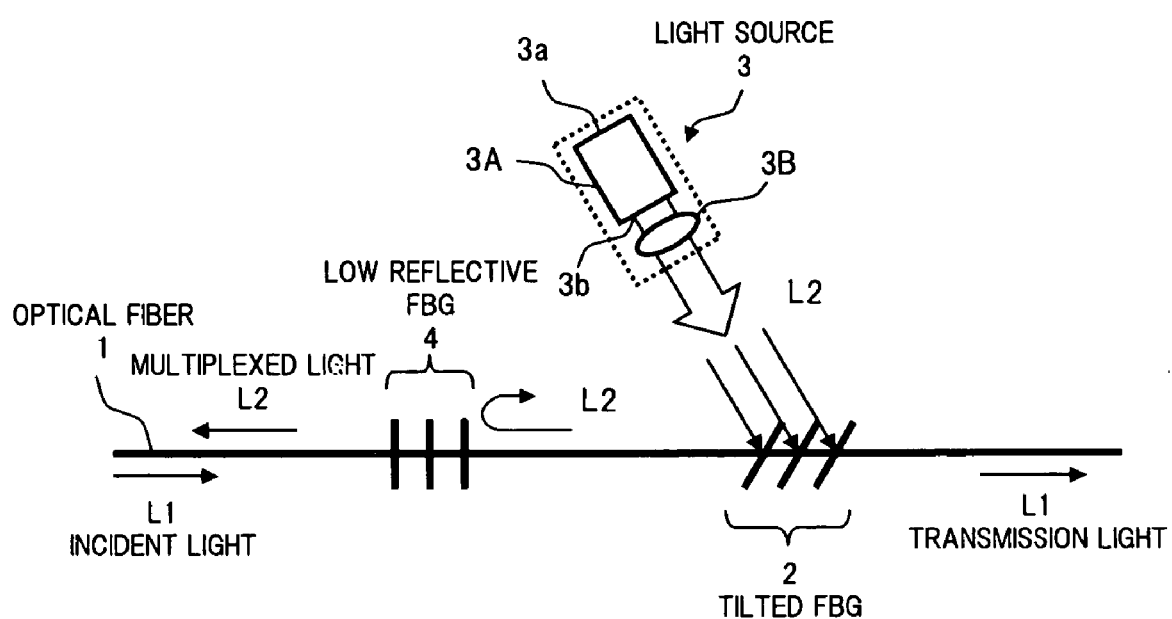
FIG. 5 is a block diagram showing another embodiment of the optical multiplexer according to the present invention.

FIG. 5 is a block diagram showing another embodiment of the optical multiplexer according to the present invention.

In FIG. 5, the optical multiplexer in the present embodiment is configured so that, in the configuration shown in FIG. 1, a low reflective FBG 4 is disposed on the optical fiber 1 to form an external resonance structure between the low reflective FBG 4 and the light source 3 using a semiconductor laser which emits the multiplexed light, so that the stabilization of wavelength of multiplexed light is achieved.

The above light source 3 includes a semiconductor laser chip 3A and a lens 3B. The semiconductor laser chip 3A is a gain medium generating a light containing a wavelength component of λ2, with an HR mirror 3a functioning as a high reflecting section of the external resonance structure being formed on a rear side end face thereof and an AR coat being coated on a front side end face thereof. The lens 3B is the one previously designed so that the light emitted from the front side end face of the semiconductor laser chip 3A is incident on the tilted FBG 2 of the optical fiber 1 in an optimum beam shape.

Figure 6:
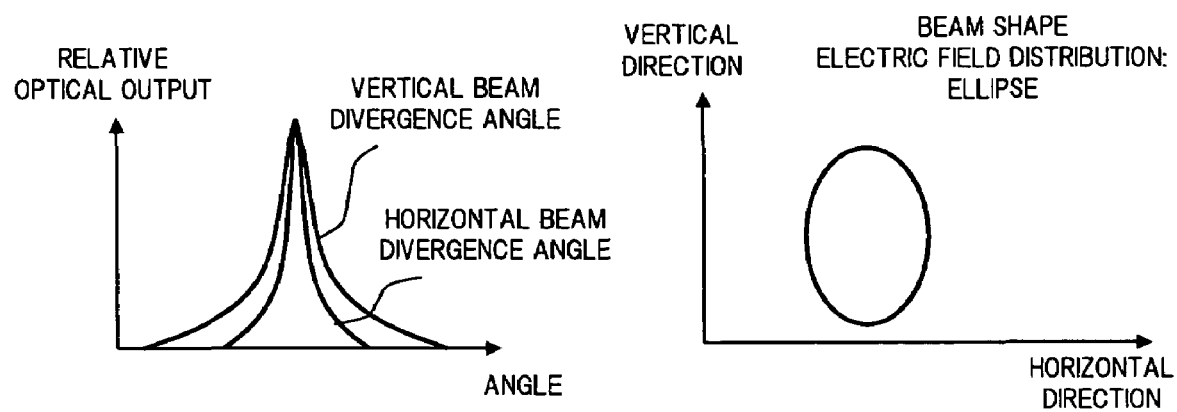
FIG. 6 is a diagram for explaining an optical beam emitted from a semiconductor laser.

Here, the optimum beam shape of the light incident on the tilted FBG 2 will be specifically described. As described in the above, in order to achieve the cost reduction and the high reliability maintenance of the light source 3 generating the multiplexed light, it is necessary to improve the coupling efficiency of the multiplexed light. Therefore, in order to realize the high coupling efficiency, not only the high reflection of the tilted FBG 2 but also the optical system designing on an optical path between the light source 3 and the core of the tilted FBG 2 become important. To be specific, by optimizing the designing of the optical characteristic of the lens 3B, the matching designing of the refractive index of the medium (cladding, coating) on the above optical path, and the designing of a parameter (for example, refractive index modulation width Δn and the like) of the tilted FBG 2, it becomes possible to achieve the high coupling efficiency of the multiplexed light. Further, in such optimum designing, it is desirable to perform the optical designing such that the tolerance to the coupling efficiency deterioration is increased, taking into consideration of a manufacturing error, such as displacement or the like, of the light source 3 or the tilted FBG 2. For example, it is preferable to perform the matching of the refractive index of the medium (cladding, coating) on the optical path, so as to achieve the optical beam emission direction in which the number of axes in the optical axis matching of the light source 3 is decreased. Further, it is desirable to perform the optical designing between the light source 3 and the tilted FBG 2, on the condition that the electric field distribution of the optical beam emitted from the light source 3 is approximately coincident with the electric field distribution of the light of the wavelength λ2 incident on and emitted from the tilted FBG 2. To be specific, it is preferable that, by adopting, as the lens 3B, a ball lens, an aspherical lens, a cylindrical lens, a prism, a special lens, or a combination of these plurality of lenses, the electric field distribution in a vertical direction of the optical beam emitted from the semiconductor laser chip 3A (for example, an elliptic electric field as shown in FIG. 6) is converted into a shape corresponding to the electric field distribution of incident light and emitted light on and from the tilted FBG 2 (for example, an electric field according to the grating position as shown in the lower left of FIG. 7).

The aspherical lens is the one having a lens surface other than spherical surface. In a spherical lens, the light passing through the center portion of the lens is focused on a focal point. However, the light passing through a circumferential portion of the lens has an angle further inclined to the spherical surface, and therefore, is focused on a position forwardly displaced from the focal point (spherical abberation). In order to suppress an occurrence of spherical abberation, the aspherical lens is formed to have a gentle curvature surface on the circumference side, thereby enabling the light to be focused on one point. Although the aspherical lens is difficult to be processed, it has an effect to enable a correction of abberation with the less number of lenses, and therefore, is used for the miniaturization or the reduction of the number of lenses. Further, the cylindrical lens, which has a cylindrical refracting surface, focuses or diverges the light in a curvature direction of the lens, but does not act in a lengthwise direction thereof, and accordingly is used for the slit illumination, the light expansion in one axial direction or the like.

Figure 7:
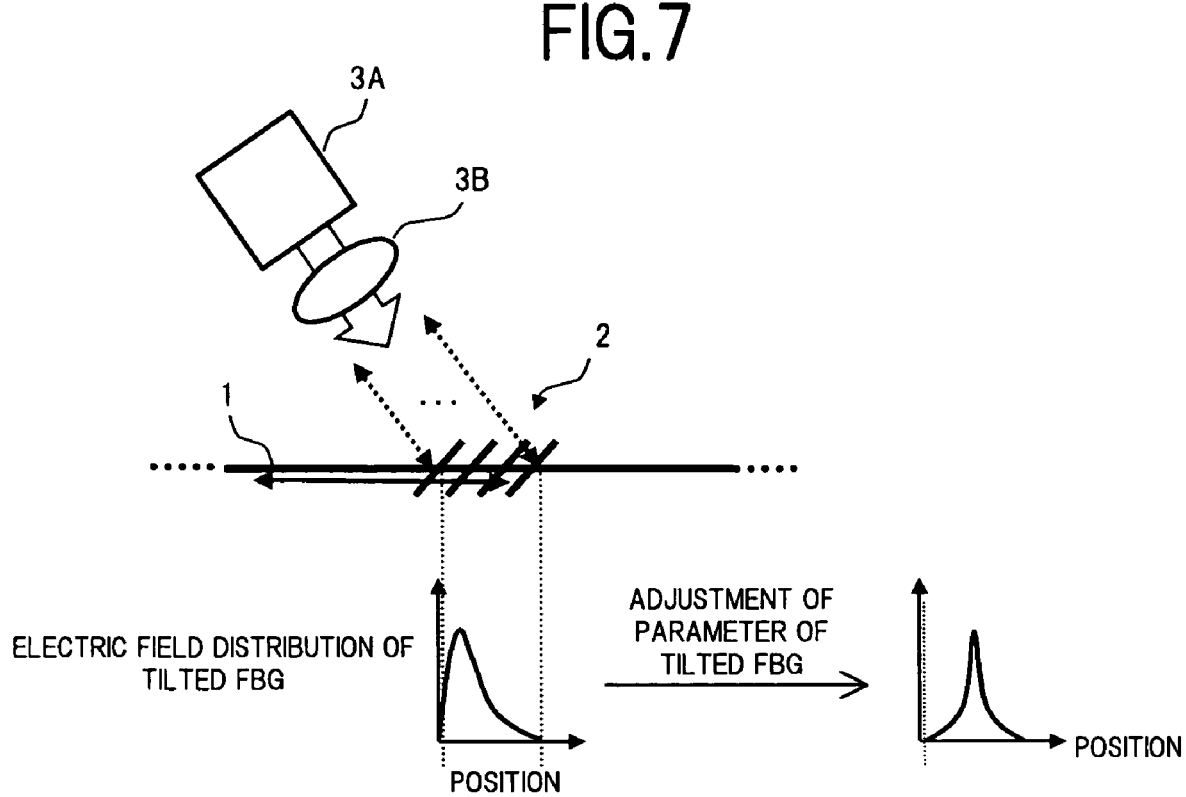
FIG. 7 is a diagram for explaining an electric field distribution of incident and emitted lights on and from the tilted FBG.

Note, when performing the optical designing of the lens 3B as described in the above, the parameter of the refractive index modulation width $\Delta n$ or the like for the tilted FBG 2 may be adjusted if necessary, to form the electric field of incident light and emitted light into a shape by which the optical designing of the lens 3B can be easily performed (for example, a shape in the lower right of FIG. 7)

Figure 8:
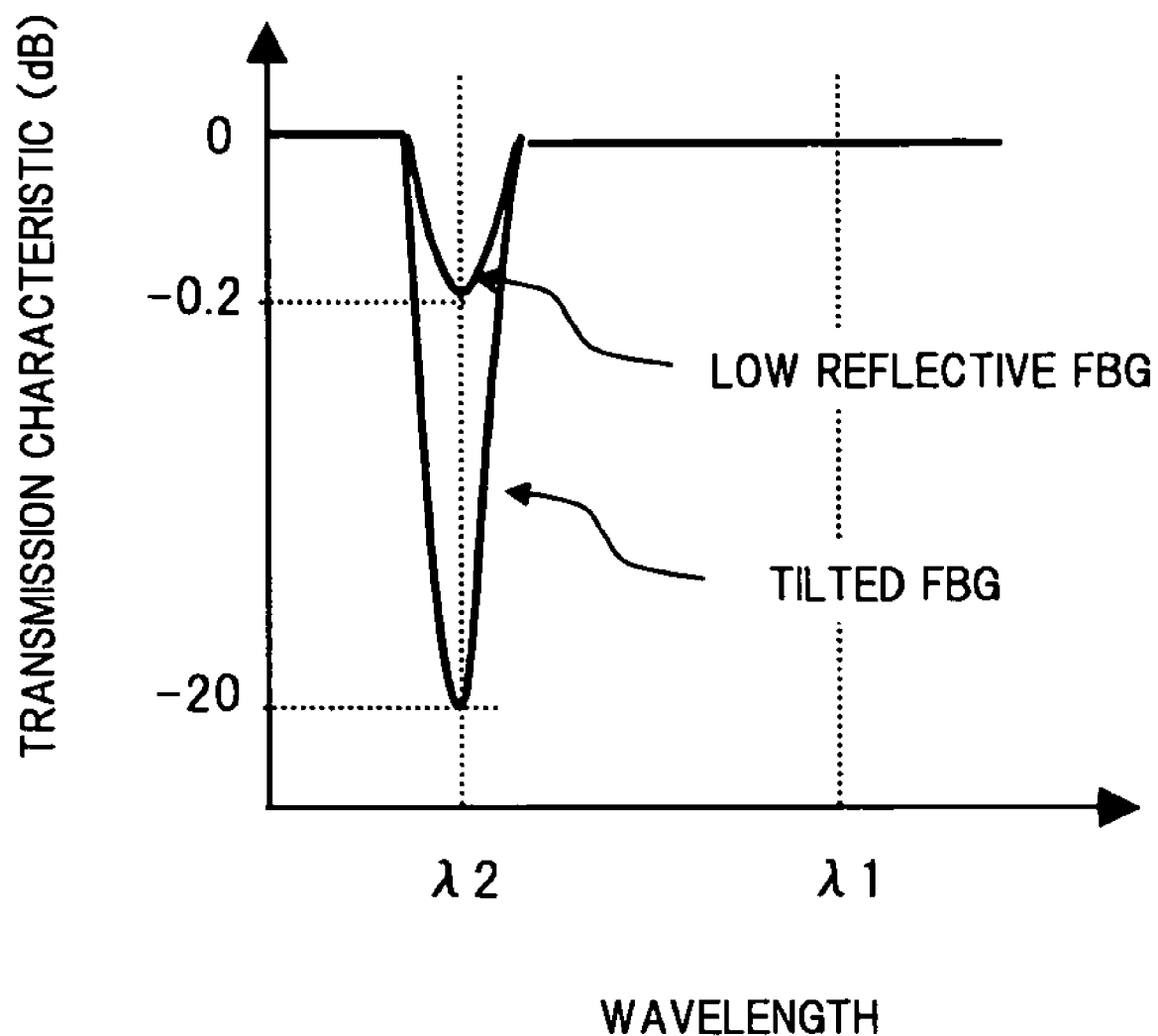
FIG. 8 is a diagram showing one example of transmission wavelength characteristics of the tilted FBG and a low reflective FBG used in the optical multiplexer in FIG. 5.

The low reflective FBG 4 is structured such that a Bragg grating, which has the sufficiently lower reflectance (for example, about several % to 10%) than the reflectance of the tilted FBG 2 relative to the light of the wavelength $\lambda 2$ and has a grating direction perpendicular to the axial direction of the optical fiber 1, and is formed on the optical fiber 1 positioned on the side where the light incident on the tilted FBG 2 from the outside and reflected is propagated. The low reflective FBG 4 functions as a lower reflection section of the external resonance structure. Note, the low reflective FBG 4 has the transmittance of about 100% relative to the light L1 of the wavelength $\lambda 1$, which is propagated through the optical fiber 1. FIG. 8 shows one example of transmission wavelength characteristics of the low reflective FBG 4 and the tilted FBG 2.

In the optical multiplexer having the above configuration, the emitted light from the light source 3 is propagated through the free space between the light source 3 and the optical fiber 1, to be incident on the tilted FBG 2 and reflected. The light reflected by the tilted FBG 2 is propagated through the optical fiber 1 toward the low reflective FBG 4, and a part of the light is further reflected by the low reflective FBG 4 to be returned, in an opposite direction, to the optical path through which the light has been propagated. As a result, the light of the wavelength $\lambda 2$ is resonated between the low reflective FBG 4 and the HR mirror 3a of the semiconductor laser chip 3A, so that the semiconductor laser oscillates at the wavelength $\lambda 2$. Such a resonance configuration is similar to an external resonance structure for the wavelength stabilization in the known semiconductor laser, and therefore, it becomes possible to stabilize the wavelength of the light L2, which is multiplexed into the optical fiber 1 via the tilted FBG 2, at $\lambda 2$. Further, since the external resonance structure is applied, the wavelength of the multiplexed light is determined by the reflective wavelength of the low reflective FBG 4. Therefore, it becomes unnecessary to coincide with high accuracy the wavelength of the light emitted from the light source 3 and the reflective wavelength of the tilted FBG 2 with the desired multiplexed wavelength (here, $\lambda 2$). As a result, the semiconductor laser generating the light of a relatively wide wavelength band containing the desired multiplexed wavelength can be used as the light source 3, and a relatively wide reflection band can be allowed for the tilted FBG 2, thereby enabling the reduction of component cost and manufacturing cost.

On the other hand, the low reflective FBG 4 is required to have a characteristic in which the reflective wavelength coincides with high accuracy with the desired multiplexed wavelength and also the reflection bandwidth is sufficiently narrow. Generally, in the FBG, it is possible to easily realize the narrow band reflection spectrum characteristic as described above. Specifically, in order to narrow the reflection spectrum bandwidth of the FBG, the refractive index modulation amplitude $\Delta n$ may be narrowed or the grating length L may be increased, based on the equation (2) described above. However, it should be noted that the reflectance is lowered when $\Delta n$ is narrowed.

Figure 9:
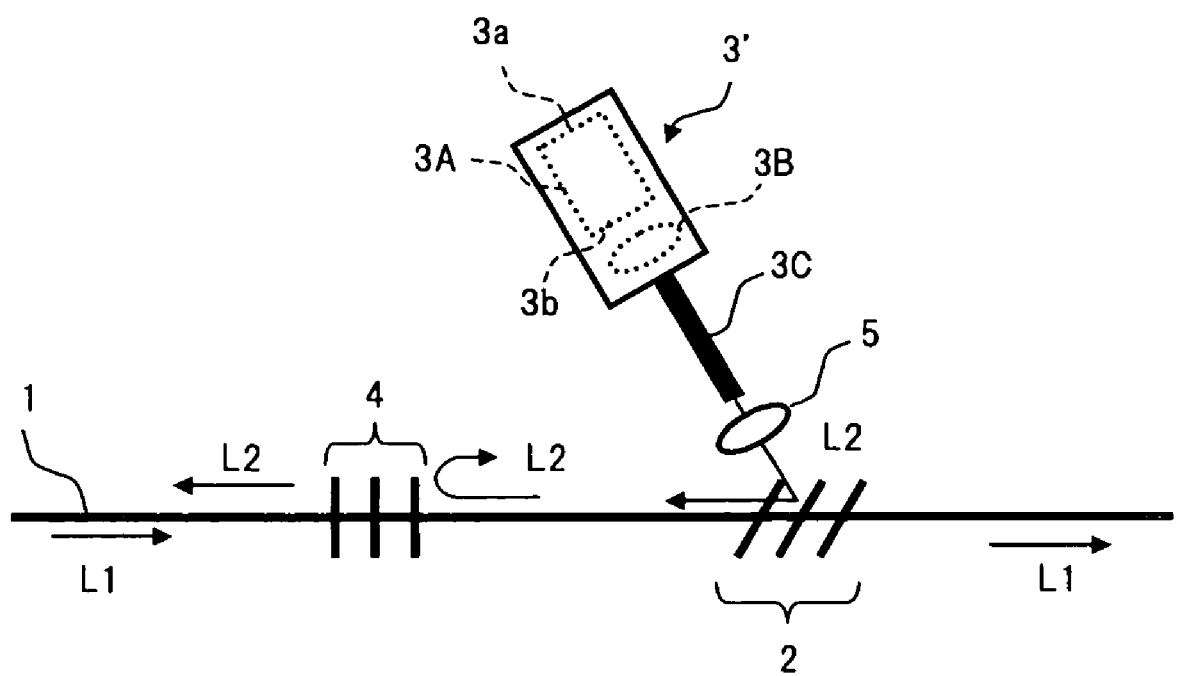
FIG. 9 is a diagram showing another configuration example related to the optical multiplexer in FIG. 5.

In the configuration shown in FIG. 5, the configuration as a specific example of the light source 3 has been shown in which the light output from the semiconductor laser chip 3B is emitted to the free space between the light source 3 and the optical fiber 1 via the lens 3B. However, other than this, it is also possible to use a pigtail type light source 3' as shown in FIG. 9 for example. In such a case, a light emitted from an output fiber 3C of the pigtail type light source 3' can be irradiated to the tilted FBG 2 via a lens 5 or the light emitted from the output fiber 3C can be directly irradiated to the tilted FBG 2.

Next, a modification example of the embodiment of the optical multiplexer described above will be described.

Figure 10:
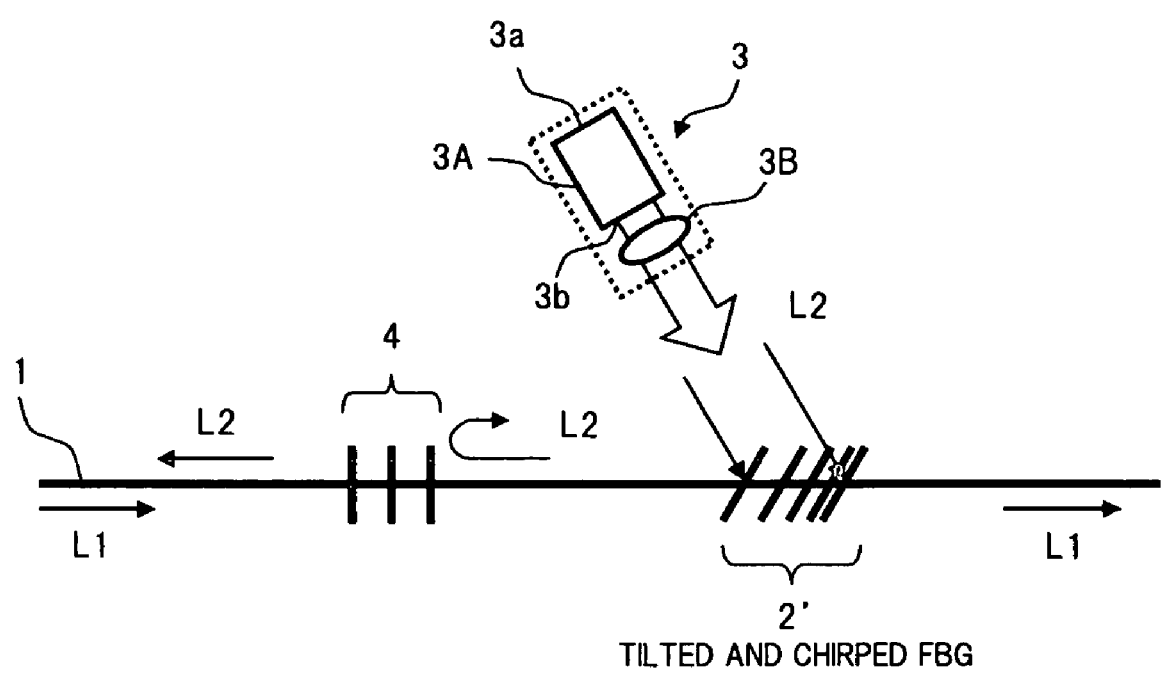
FIG. 10 is a block diagram showing a modification example of the optical multiplexer in FIG. 5.

FIG. 10 is a block diagram showing the modification example of the optical multiplexer.

The optical multiplexer in FIG. 10 is configured so that, in the configuration shown in FIG. 5, there is provided a tilted FBG 2' applied with a chirped configuration in which the grating pitch P is gradually changed along the axial direction of the optical fiber 1 (hereinuder, to be referred to as tilted and chirped FBG), instead of the tilted FBG 2 having the fixed grating pitch P. This tilted and chirped FBG 2' is structured by applying the chirped configuration to the tilted FBG 2, to broaden a reflection band thereof, so that the reflection band contains most of wavelength components of light emitted from the light source 3.

As a result, by using the tilted and chirped FBG 2', which has the relatively wide reflection band corresponding to the wavelength band of the light source 3, and also has the high reflectance, it becomes possible to couple all of the lights emitted from the light source 3 into the optical fiber 1 over the wide wavelength range. Then, the lights of wide wavelength range reflected by the tilted and chirped FBG 2' converge in a resonance wavelength determined by the reflective wavelength of the low reflective FBG 4. As a result, it becomes possible to multiplex stably the lights of the desired wavelength at the higher coupling efficiency.

Further, it has been reported that the tilted and chirped FBG 2' has the light collection performance at a predetermined wavelength by designing a chirped amount and the like (refer to U.S. Pat. No. 5,061,032). If the light collection performance at the predetermined wavelength is utilized, depending on the designing of chirped amount and the like, the lens 3B can be omitted, or even if the lens 3B is used, the focal length can be made to be shorter compared with the case where the tilted FBG 2 having the uniform grating pitch is used, or, there is a possibility of using a simple lens. Accordingly, the tilted and chirped FBG 2' is effective for the reduction of the number of components or the miniaturization.

Note, one example has been shown in which the tilted and chirped FBG 2' is applied to the optical multiplexer provided with the low reflective FBG 4. However, even in the case where the tilted and chirped FBG 2' is applied to the configuration shown in FIG. 1 and the like where the external resonance structure is not adopted, it is possible to achieve the improvement of coupling efficiency of multiplexed light in the same manner as above.

Next, another modification example of the embodiment of the optical multiplexer will be described.

Figure 11:
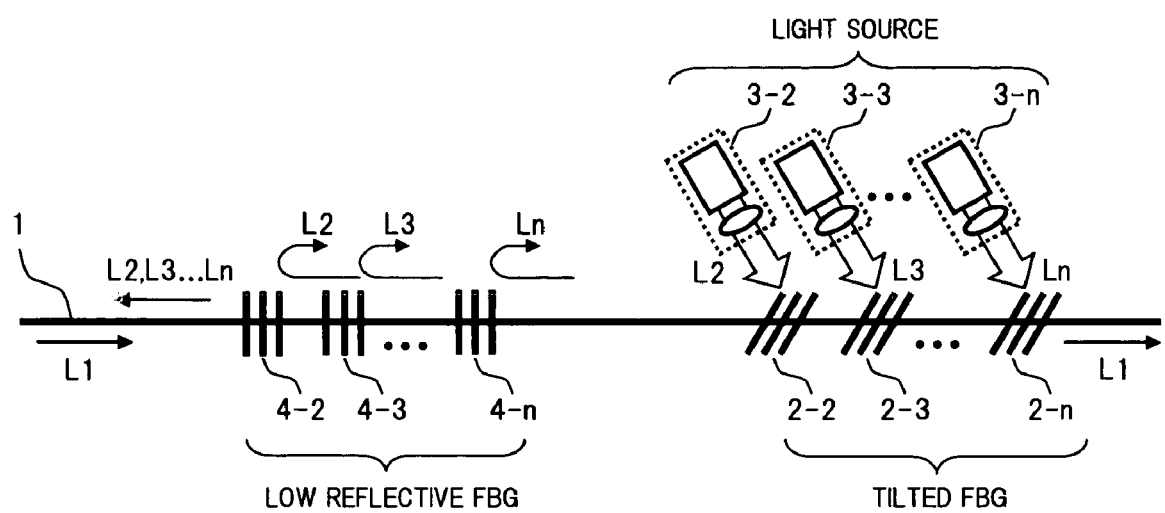
FIG. 11 is a block diagram showing another modification example of the optical multiplexer in FIG. 5.

FIG. 11 is a block diagram showing another modification example of the optical multiplexer.

In the optical multiplexer in FIG. 11, a plurality of lights L2, L3, . . . , Ln of wavelengths $\lambda 2$, $\lambda 3$, . . . , $\lambda n$ are multiplexed with the light L1 of the wavelength $\lambda 1$. To be specific, in the configuration shown in FIG. 5 described above, the tilted FBG 2, the light source 3 and the low reflective FBG 4 are disposed corresponding to each of the wavelengths $\lambda 2$ to $\lambda n$. The tilted FBGs 2-2 to 2-n for the wavelengths $\lambda 2$ to $\lambda n$, which are tandem arranged on the optical fiber 1, are configured so that transmission wavelength characteristics exemplarily shown in FIG. 12 can be obtained as a whole. Further, similar to this, the low reflective FBGs 4-2 to 4-n for the wavelengths $\lambda 2$ to $\lambda n$ are tandem arranged on the optical fiber 1. Note, the reflectance and the reflection band of each of the tilted FBGs and the low reflective FBGs corresponding to each wavelength are set in the same manner as in the embodiment shown in FIG. 5.

The positioning of each of n−1 light sources 3-2 to 3-n is performed, so that the multiplexed light is incident at the incident angle $\theta_0$ determined in accordance with the relationship in the equation (5), on each of the tilted FBGs 2-2 to 2-n for the wavelengths $\lambda 2$ to $\lambda n$, which are tandem arranged on the optical fiber 1. As the light sources 3-2 to 3-n, a semiconductor lasers each having the center wavelength corresponding to each of the wavelengths $\lambda 2$ to $\lambda n$ may be prepared individually. Or, a semiconductor laser having a wide wavelength band containing more than two waves among the wavelengths $\lambda 2$ to $\lambda n$, may be adopted to be used as each light source corresponding to the wide wavelength band. In the configuration example in FIG. 11, the light sources 3-2 to 3-n are individually disposed corresponding to the tilted FBGs 2-2 to 2-n for the wavelengths $\lambda 2$ to $\lambda n$. However, since there is a free space between the light sources 3-2 to 3-n and the tilted FBGs 2-2 to 2-n without the optical fiber, it is easy to integrate or array in parallel the semiconductor laser chips constructing the light sources 3-2 to 3-n and the lenses on the same substrate. If the plurality of light sources 3-2 to 3-n is integrated with each other, it becomes possible to reduce effectively the number of components.

In the optical multiplexer of the configuration described above, the lights emitted from the light sources 3-2 to 3-n are reflected by the tilted FBGs 2-2 to 2-n, respectively, to be coupled in the optical fiber 1, and a part of each of the lights is further reflected by each of the low reflective FBGs 4-2 to 4-n, to be returned, in the opposite direction, to the optical path through which the light has been propagated. As a result, the lights of the wavelengths $\lambda 2$ to $\lambda n$ are resonated between the low reflective FBGs 4-2 to 4-n and the light sources 3-2 to 3-n, so that the light sources 3-2 to 3-2 oscillate at the corresponding wavelengths, respectively. Therefore, it becomes possible to multiplex at the high coupling efficiency the lights L2 to Ln of the wavelengths $\lambda 2$ to $\lambda n$ corresponding to the reflective wavelength of the FBGs 4-2 to 4-n, to the light L1 being propagated through the optical fiber 1.

Next, a further modification example of the optical multiplexer corresponding to the multiplexed light of a plurality of wavelengths will be described.

Figure 13:
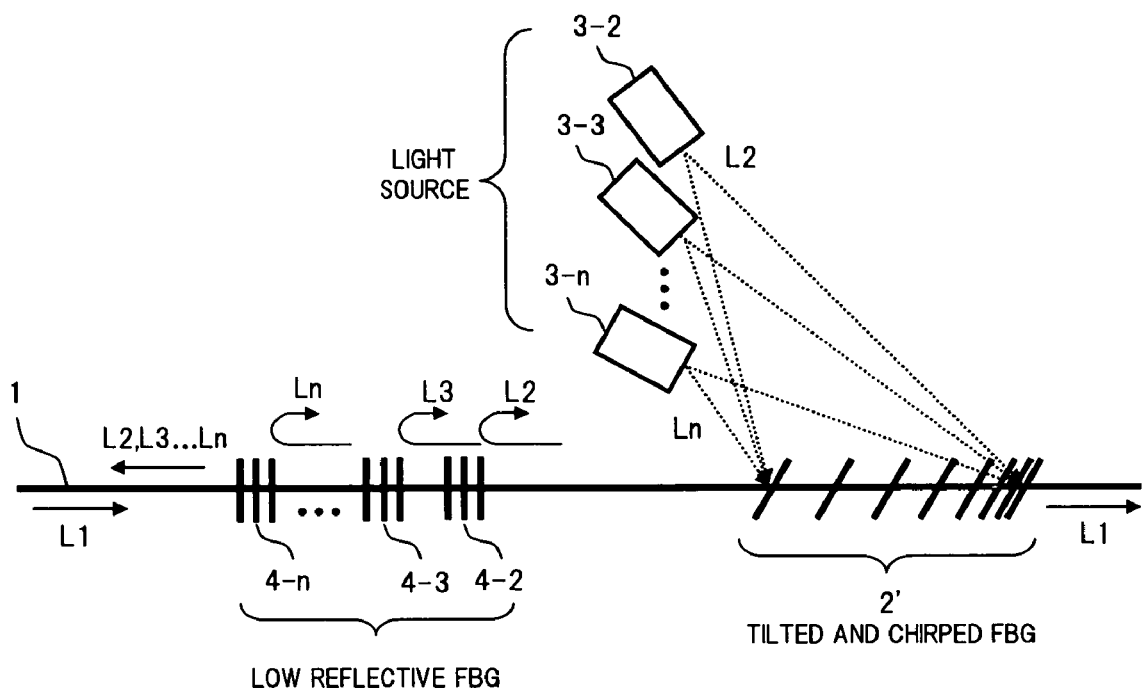
FIG. 13 is a block diagram showing a further modification example of the optical multiplexer in FIG. 5.

FIG. 13 is a block diagram showing the further modification example of the optical multiplexer.

The optical multiplexer in FIG. 13 is configured so that the light collection performance of the tilted and chirped FBG described in the modification example of FIG. 10 is utilized, and the tilted and chirped FBG 2' formed on a portion of the optical fiber 1 is used to perform the multiplexing of the lights L2 to Ln of the plurality of wavelengths $\lambda 2$ to $\lambda n$. Here, for a single tilted and chirped FBG 2' on the optical fiber 1, n-1 light sources 3-2 to 3-n are linearly arranged in a vertical direction to the axial direction of the optical fiber 1. The positioning of the light sources 3-2 to 3-n is determined in accordance with design parameters of the tilted and chirped FBG 2' and the low reflective FBGs 4-2 to 4-n, so that transmission wavelength characteristics similar to those shown in FIG. 12 can be obtained in the tilted and chirped FBG 2'. Note, the characteristics of the light sources 3-2 to 3-n, and the low reflective FBGs 4-2 to 4-n corresponding to the wavelengths $\lambda 2$ to $\lambda n$, are similar to those in the modification example shown in FIG. 11.

Also in the optical multiplexer of the above configuration, similar to the modification example shown in FIG. 11, the lights emitted from the light sources 3-2 to 3-n are oscillated at the wavelengths $\lambda 2$ to $\lambda n$ corresponding to the reflective wavelengths of the low reflective FBGs 4-2 to 4-n, respectively. Therefore, it becomes possible to multiplex at the high coupling efficiency the lights L2 to Ln of the wavelengths $\lambda 2$ to $\lambda n$ to the light L1 of the wavelength $\lambda 1$ being propagated through the optical fiber 1.

Figure 12:
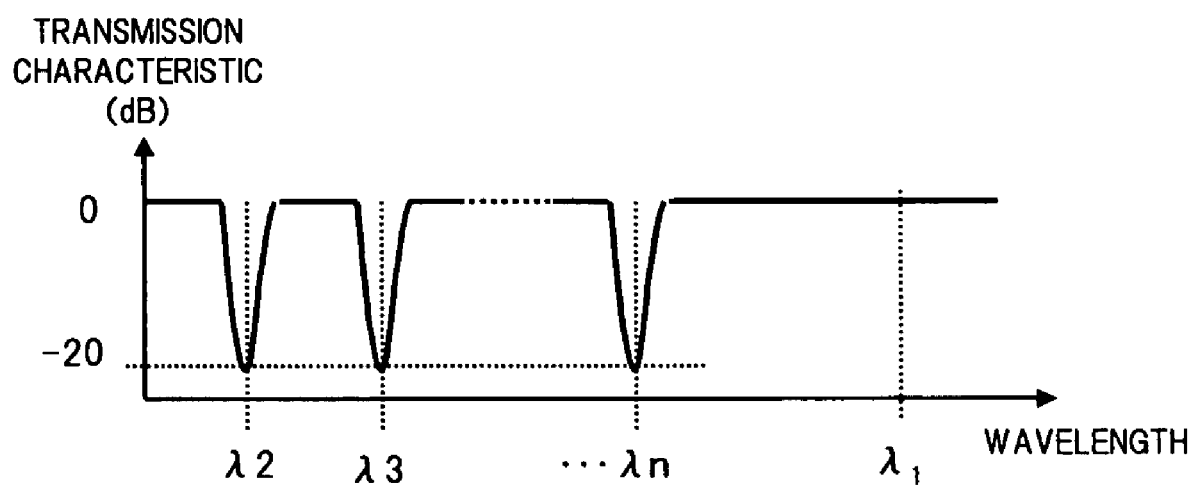
FIG. 12 is a diagram showing one example of transmission wavelength characteristics of tilted FBG used in the optical multiplexer in FIG. 11.

In each of the modification examples of FIGS. 11 to 13, the configuration has been such that the optical multiplexer having the external resonance structure corresponds to the multiplexed light of the plurality of wavelengths. However, also the configuration shown in FIG. 1 and the like, which does not have the external resonance structure, can correspond to the multiplexed light of the plurality of wavelengths by providing the tilted FBGs and the light sources in the same manner as above.

Further, the light sources 3-2 to 3-n have been disposed as the generating sources of the lights of the wavelengths $\lambda 2$ to $\lambda n$ on a one for one basis. However, as shown in FIG. 14 for example, the configuration may be such that the lights sources 3-2 to 3-n pairs, each pair emitting lights in different polarization states, are disposed for the respective wavelengths $\lambda 2$ to $\lambda n$, the lights emitted from each pair are combined with each other using each of polarization combining devices 6-2 to 6-n, and the light emitted from each of the polarization combining devices 6-2 to 6-n is irradiated to each of the tilted FBGs 2-2 to 2-n.

Figure 14:
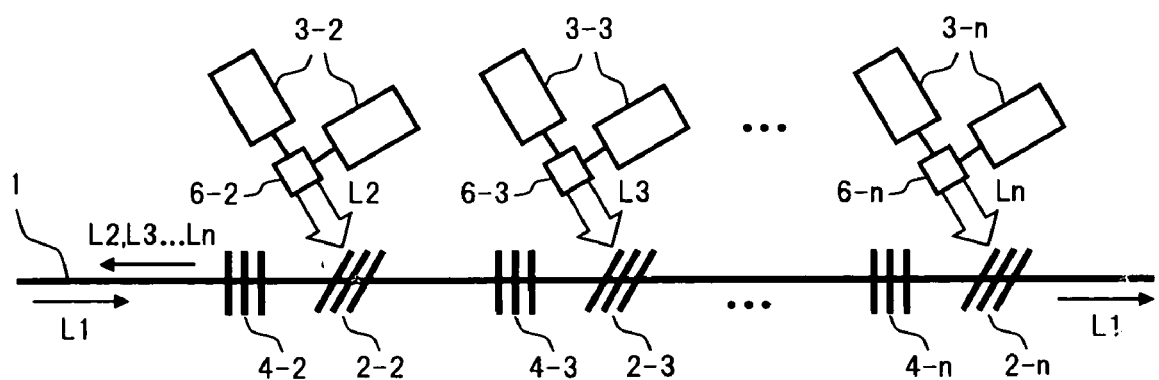
FIG. 14 is a diagram showing a configuration example of a light source emitting a multiplexed light in the optical multiplexer of the present invention.
Figure 15:
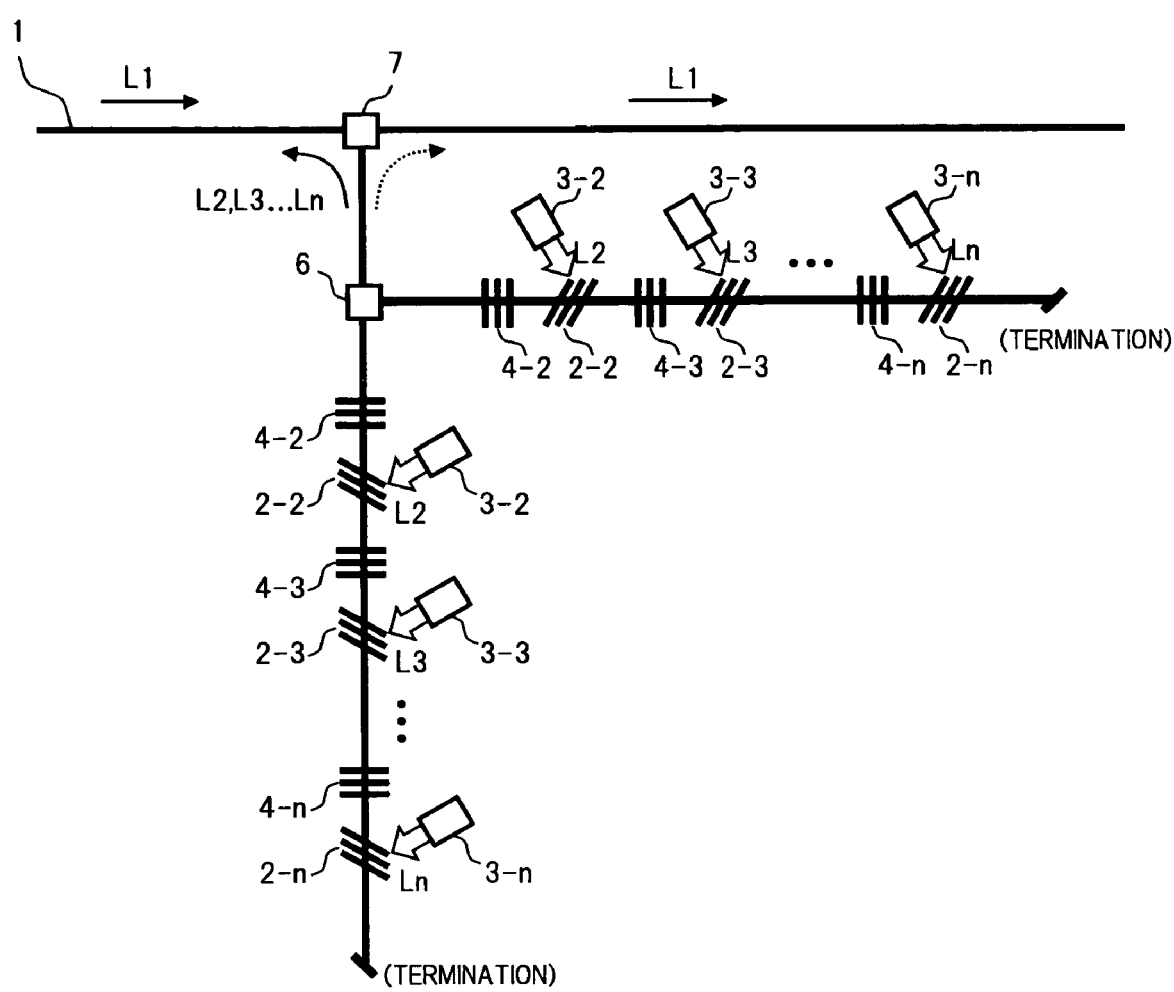
FIG. 15 is a diagram showing another configuration example of the light source emitting the multiplexed light in the optical multiplexer of the present invention.

Further, as a modification example of the configuration shown in FIG. 14, as shown in FIG. 15, the configuration may be such that the lights of the wavelengths $\lambda 2$ to $\lambda n$, which have been independently multiplexed on each of two optical fibers using the tilted FBGs and the low reflective FBGs according to the present invention, are combined by a single polarization combining device 6, and an output light from the polarization combining device 6 is given on the optical fiber 1 through which the light L1 of the wavelength $\lambda 1$ is propagated, using a typical optical multiplexer 7. If such a configuration is applied, it becomes possible to reduce the number of polarization combining devices in the case where the polarization state of the multiplexed light needs to be maintained.

In the configuration examples of FIG. 14 and FIG. 15, the low reflective FBGs 4-2 to 4-n have been arranged for each of the tilted FBGs 2-2 to 2-n. However, as shown in FIG. 11, it is also possible to arrange the respective low reflective FBGs 4-2 to 4-n on one location collectively.

In addition, in the respective embodiments and the modification examples thereof in the present invention, since the temperature or the pressure, or both of them of the FBG portion of each of the tilted FBG 2, the tilted and chirped FBG 2' and the low reflective FBG 4, can be changed to change the reflective wavelength characteristic, it is also possible to adopt an application in which the multiplexed wavelength is made variable.

Next, embodiments of an optical amplifier configured using the optical multiplexer of the present invention will be described.

Figure 16:
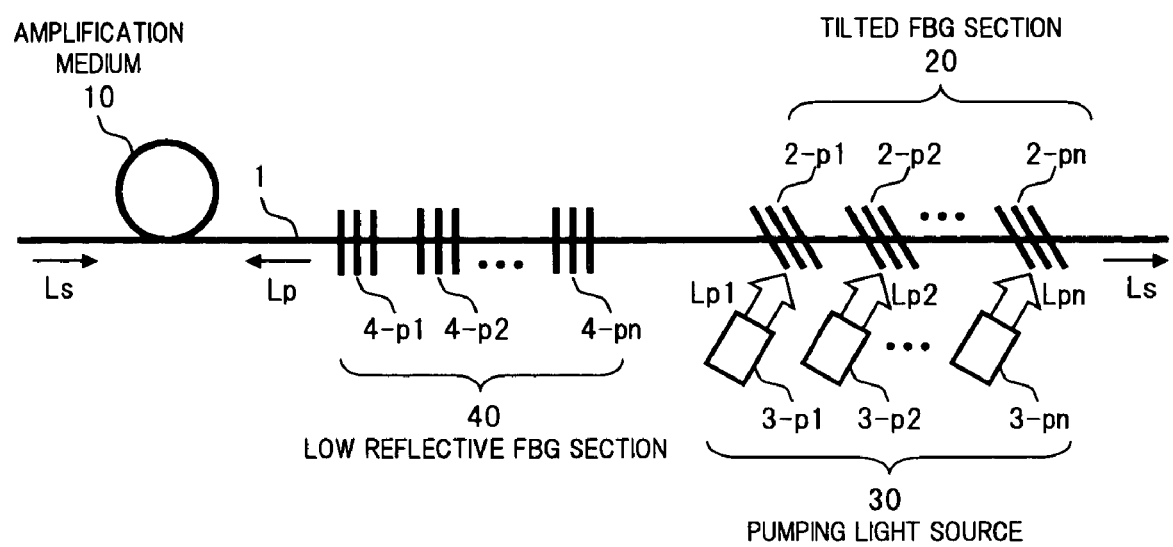
FIG. 16 is a block diagram showing one embodiment of an optical amplifier according to the present invention.

FIG. 16 is a block diagram showing one embodiment of the optical amplifier according to the present invention.

In FIG. 16, the present embodiment is configured such that the configuration shown in FIG. 11 for example, is applied, as a configuration of pumping light multiplexing system for supplying pumping lights Lp1, Lp2, ..., Lpn of wavelengths $\lambda p1, \lambda p2, \ldots, \lambda pn$, to an amplification medium 10, to an optical amplifier (for example, a rare earth element doped fiber amplifier, a Raman amplifier or the like), which supplies the pumping lights Lp1, Lp2, ..., Lpn of the wavelengths $\lambda p1, \lambda p2, \ldots, \lambda pn$, to the amplification medium 10, thereby amplifying a signal light Ls being propagated through the amplification medium 10 to output the amplified signal light Ls. To be specific, for example, a tilted FBG section 20 and a low reflective FBG section 40 are formed on the optical fiber 1 connected to one end of the amplification medium 10 which received the signal light Ls at the other end. The pumping lights Lp1 to Lpn of the wavelengths $\lambda p1$ to $\lambda pn$ emitted from a pumping light source section 30 are irradiated to the tilted FBG section 20, so that the pumping lights Lp1 to Lpn coupled on the optical fiber 1 are supplied to the amplification medium 10 as backward pumping lights.

As the amplification medium 10, there are a rare earth element doped fiber in the rare earth element doped fiber amplifier, and a transmission path fiber (distribution system) and a high nonlinear type fiber (concentration system) in the Raman amplifier. The tilted FBG section 20 and the low reflective FBG section 40 include respectively tilted FBGs 2-p1 to 2-pn and low reflective FBGs 4-p1 to 4-pn, reflection bands thereof being set corresponding to desired pumping light wavelengths $\lambda p1$ to $\lambda pn$ determined depending on a wavelength band of the signal light Ls and a type of amplification medium 10, in the same manner as in the optical multiplexer shown in FIG. 11, and the respective tilted FBGs 2-p1 to 2-pn and low reflective FBGs 4-p1 to 4-pn are tandem arranged. The pumping light source section 30 includes pumping light sources 3-p1 to 3-pn generating lights respectively corresponding to the desired pumping light wavelengths $\lambda p1$ to $\lambda pn$. The lights emitted from the pumping light sources 3-p1 to 3-pn are incident on the tilted FBGs 2-p1 to 2-pn at a predetermined incident angle $\theta_0$.

Figure 17:
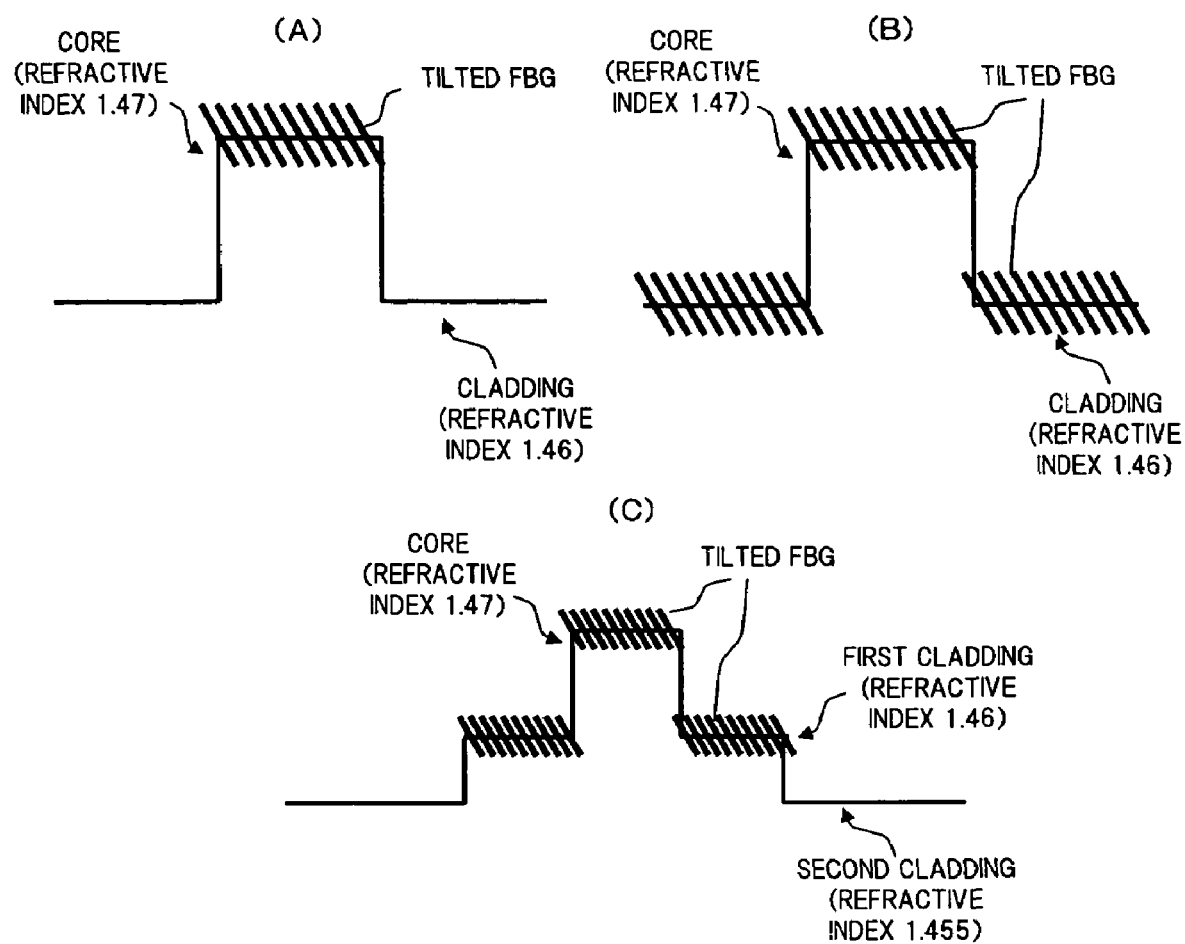
FIG. 17 is a diagram showing a specific configuration of a tilted FBG used in the optical amplifier of FIG. 16.

As a specific configuration, as shown in (A) of FIG. 17, each of the tilted FBGs 2-p1 to 2-pn may be formed on a core portion (refractive index 1.47) of the optical fiber 1, so that the overlap with the signal light Ls being propagated through the core becomes large. Further, as shown in (B) of FIG. 17 for example, each tilted FBG may be formed onto a cladding portion (refractive index 1.46) of the optical fiber 1, so that the tolerance of irradiation position of the light emitted from each of the pumping light sources 3-p1 to 3-pn relative to each of the tilted FBGs 2-p1 to 2-pn becomes large. Note, in the case where the optical fiber 1 has a double cladding structure, as shown in (C) of FIG. 17, it is preferable to form each tilted FBG onto an inner cladding portion (refractive index 1.46). As shown in (B) and (C) of FIG. 17, in the case where each tilted FBG is formed on each of the core portion and the cladding portion, a high power product of multi-mode may be applied to each of the pumping light sources 3-p1 to 3-pn, to propagate each of the pumping lights Lp1 to Lpn through the cladding.

In the optical amplifier of the configuration described above, each light emitted from each of the pumping light sources 3-p1 to 3-pn is reflected by each of the tilted FBGs 2-p1 to 2-pn to be coupled in the optical fiber 1, and a part of each reflected light is further reflected by each of the low reflective FBGs 4-p1 to 4-pn, to be returned, in the opposite direction, to the optical path through which the light has been propagated. As a result, the lights of the wavelengths $\lambda p1$ to $\lambda pn$ are resonated between the low reflective FBGs 4-p1 to 4-pn and the pumping light sources 3-p1 to 3-pn, respectively, and each of the pumping light sources 3-p1 to 3-pn oscillates at the corresponding wavelength. Then, the pumping lights Lp1 to Lpn of the wavelengths $\lambda p1$ to $\lambda pn$, which have been transmitted through the low reflective FBGs 4-p1 to 4-pn, are supplied to the amplification medium 10 as the backward pumping lights being propagated in a direction opposite to that of the signal light Ls. In the amplification medium 10 supplied with the pumping lights Lp1 to Lpn, the optical amplification is performed on the passing signal light Ls.

Figure 18:
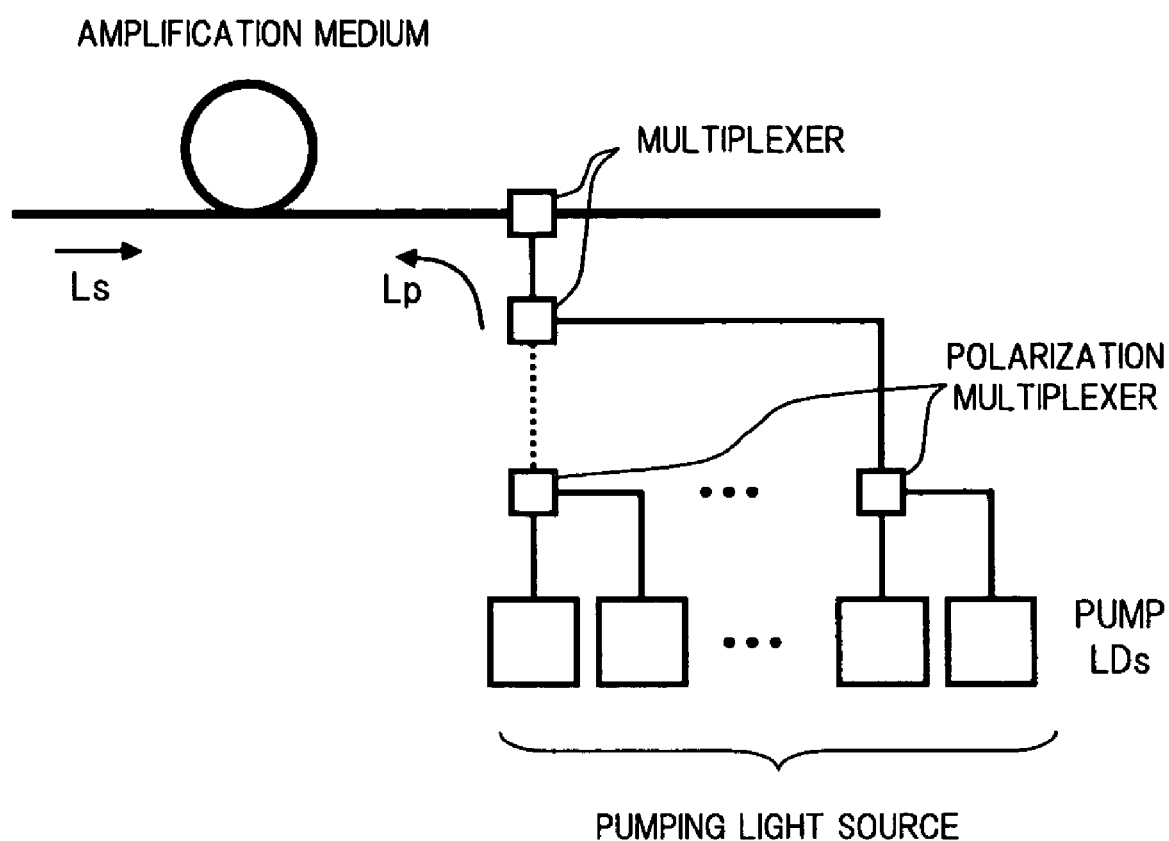
FIG. 18 is a diagram showing a configuration example of a pumping light multiplexing system in a conventional optical amplifier.

According to the present optical amplifier, by utilizing excellent characteristics (a sharp narrow band reflective wavelength characteristic, a low loss to a main signal system) of the FBG, the pumping lights Lp1 to Lpn of the plural wavelengths are multiplexed on the optical fiber 1 connected to the amplification medium 10, with a very simple configuration. Therefore, the number of components of the pumping light multiplexing system in the optical amplifier can be reduced, and also the pumping lights Lp1 to Lpn can be supplied to the amplification medium 10 at the high coupling efficiency. To be specific, for example in comparison with a configuration of pumping light multiplexing system in a conventional optical amplifier as shown in FIG. 18, the multiplexer or the polarization combining device configured using a dielectric multi-layer film becomes unnecessary, and only the optical fiber 1 formed with the tilted FBG section 20 and the low reflective FBG section 40 is only a component of the present amplifier. Therefore, the number of components can be significantly reduced. Further, there have existed many splicing portions for connecting the multiplexers or the polarization combining devices in the conventional configuration. However, in the present optical amplifier, such splicing portions no longer exist, and therefore, losses occurring in the pumping lights can be made to be remarkably less.

Note, in the above optical amplifier, the optical fiber 1 formed with the tilted FBG section 20 and the low reflective FBG section 40 is connected to the amplification medium 10. However, it is also possible to directly form the tilted FBG section 20 and the low reflective FBG section 40 on the amplification medium 10. In such a case, the number of components of the pumping light multiplexing system can be made substantially zero (the pumping light source is not included).

Figure 19:
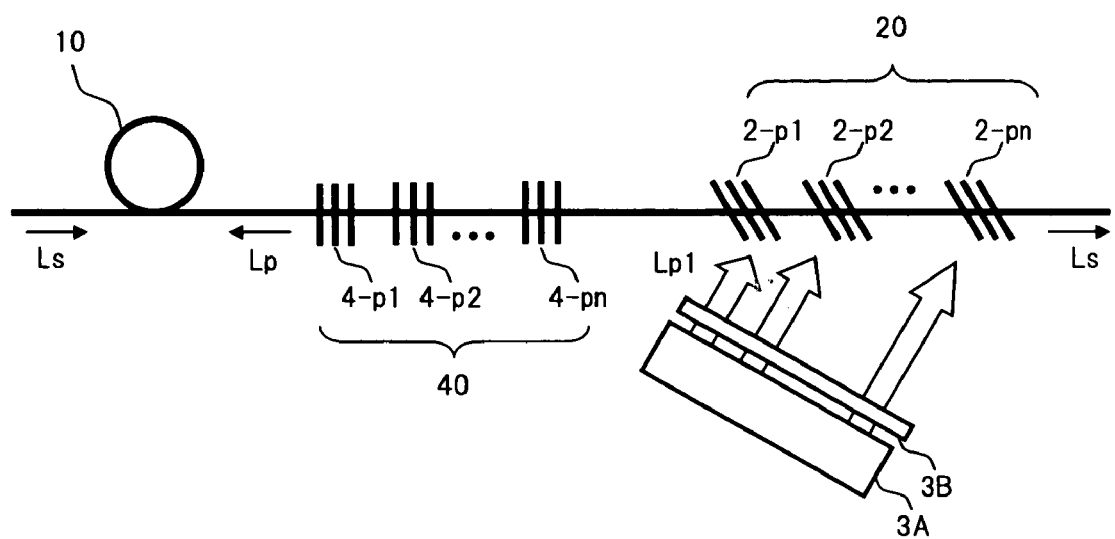
FIG. 19 is a diagram showing one example in which a light source used in the optical amplifier of FIG. 16 is an arrayed integrated component.

Further, the plurality of pumping light sources 3-p1 to 3-pn is individually disposed corresponding to the pumping light wavelengths $\lambda p1$ to $\lambda pn$. However, as shown in FIG. 19 for example, it is also possible to construct a component having a function common to each pumping light source, as an arrayed integrated component (here, an LD array 3A and a lens array 3B, and also an (LD+lens) array may be used). By using such an arrayed integrated component, it is possible to further reduce the number of components of the optical amplifier and the assembly cost.

Next, as specific examples related to the embodiment of the optical amplifier described above, the description will be made on the case where the present invention is applied to the rare earth element doped fiber amplifier.

Figure 20:
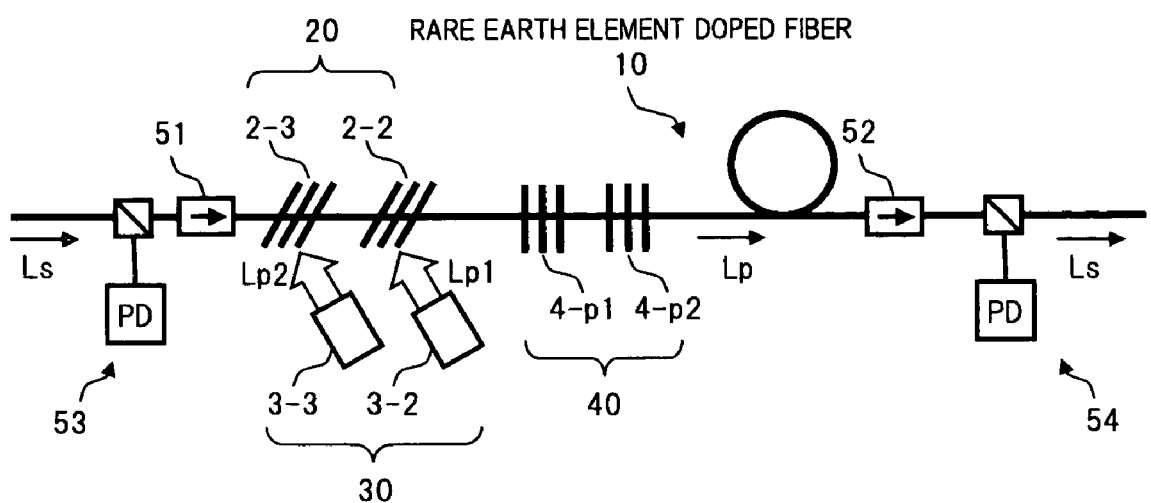
FIG. 20 is a diagram showing a configuration example of a rare earth element doped fiber amplifier applied with the present invention.

FIG. 20 is a diagram showing a configuration example of the rare earth element doped fiber amplifier to which the present invention is applied.

The rare earth element doped fiber amplifier in FIG. 20 is provided with a rare earth element doped fiber obtained by doping a rare earth element to an optical fiber, as the amplification medium 10. This rare earth element doped fiber 10 is formed with the tilted FBG section 20 and the low reflective FBG section 40 in the vicinity of a signal light input end thereof, and the pumping lights Lp1 and Lp2 emitted from the pumping light sources 3-p1 and 3-p2 of the pumping light source section 30 are irradiated to the tilted FBGs 2-p1 and 2-p2, to be given as forward pumping lights. Further, optical isolators 51 and 52 are connected to signal light input and output ends of the rare earth element doped fiber 10, and further, there are provided an input monitor 53 for monitoring the signal light Ls input to the rare earth element doped fiber 10 and an output monitor 54 for monitoring the signal light Ls output from the rare earth element doped fiber 10.

However, the configuration of the rare earth element doped fiber amplifier to which the present invention is applied, is not limited to the above example. For example, in the case where a known optical filter is constituted by the tilted FBG and the like, as means for equalizing a gain wavelength characteristic of the optical amplifier, it is possible to form the tilted FBG for gain equalization and the above described titled FBG for pumping light multiplexing on the same fiber, thereby achieving the reduction of the number of components. Further, it is also effective for the reduction of the number of components that monitoring couplers used for the input monitor 53 and the output monitor 54 are constituted by the tilted FBGs and formed on the fiber on which the tilted FBG for pumping light multiplexing is formed.

In the rare earth element doped fiber amplifier of the configuration described above, the tilted FBG section 20 and the low reflective FBG section 40 are designed to have transmission wavelength characteristics as exemplarily shown in FIG. 21 relative to the wavelength band of the signal light Ls, and the pumping lights $\lambda p1$ and $\lambda p2$, so that the pumping lights Lp1 and Lp2 emitted from the pumping light sources 3-p1 and 3-p2 are stably supplied to the rare earth element doped fiber 10 at the high coupling efficiency with a simple configuration. As a result that the pumping lights Lp1 and Lp2 are supplied, the rare earth element in the rare earth element doped fiber 10 becomes a pumped state, so that the optical amplification is performed on the signal light Ls input to the rare earth element doped fiber 10. Further, states of the signal light Ls input and output to and from the rare earth element doped fiber 10 are monitored by the input monitor 53 and the output monitor 54, and based on the monitoring results, drive controls and the like of the pumping light sources 3-p1 and 3-p2 are performed.

In the rare earth element doped fiber amplifier described above, since the tilted FBG section 20 and the low reflective FBG section 40 are formed on the rare earth element doped fiber 10 itself, the components of the pumping light multiplexing system and the amplification medium are made to be common. Therefore, it is possible to multiplex the pumping lights using the less number of components. Although the tilted FBG section 20 and the low reflective FBG section 40 are formed in the vicinity of the signal light input end of the rare earth element doped fiber 10 herein, it is possible to form the tilted FBG section 20 and the low reflective FBG section 40 on arbitrary positions in a longitudinal direction of the rare earth element doped fiber 10. As a result, it becomes possible to easily apply not only an end pumping method (a pumping method for inputting pumping light from either one or both of the ends of the amplification medium), which is mainstream of conventional single mode pumping methods) but also a pumping method for inputting pumping light halfway across the amplification medium (hereinuder, to be referred to as a side pumping method), thereby enabling the expansion of free degree in designing of the rare earth element doped fiber amplifier.

Figure 22:
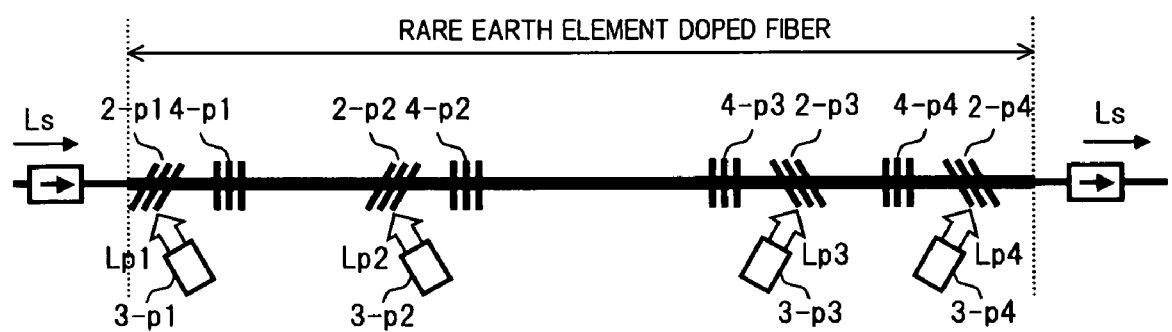
FIG. 22 is a diagram showing a specific example in which a side pumping method is applied to the rare earth element doped fiber amplifier of FIG. 20.
Figure 23:
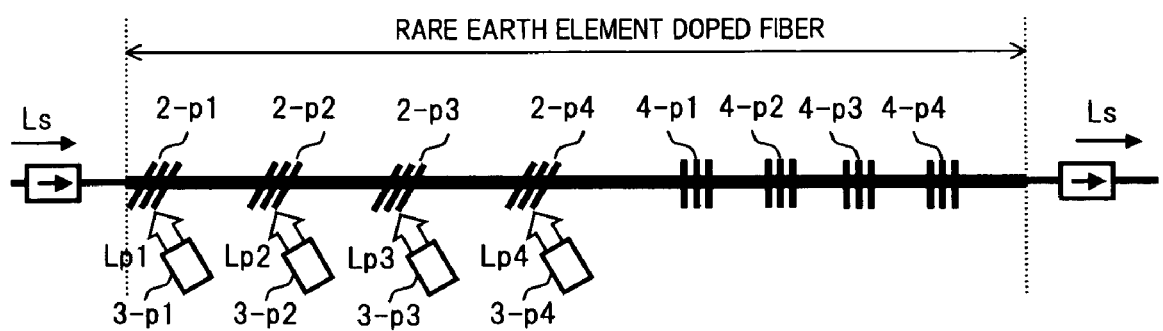
FIG. 23 is a diagram showing another specific example in which the side pumping method is applied to the rare earth element doped fiber amplifier of FIG. 20.

FIG. 22 and FIG. 23 are diagrams showing specific examples of the rare earth element doped fiber amplifier to which the side pumping method is applied. In FIG. 22, the tilted FBGs 2-p1 and 2-p2, and the low reflective FBGs 4-p1 and 4-p2 are formed on a former part in the longitudinal direction of the rare earth element doped fiber, so that the forward pumping lights Lp1 and Lp2 are input to the tilted FBGs 2-p1 and 2-p2 by the side pumping method, and also, the tilted FBGs 2-p3 and 2-p4, and the low reflective FBGs 4-p3 and 4-p4 are formed on a latter part, so that the backward pumping lights Lp3 and Lp4 are input to the tilted FBGs 2-p3 and 2-p4 by the side pumping method. Further, in FIG. 23, the tilted FBGs 2-p1 to 2-p4 are formed on the former part in the longitudinal direction of the rare earth element doped fiber, and the low reflective FBGs 4-p1 to 4-p4 are formed on the latter part, so that the forward pumping lights Lp1 to Lp4 are input to the tilted FBGs 2-p1 to 2-p4.

If the side pumping method described above is applied, since it is possible to set freely the positions in the longitudinal direction for performing the optical amplification in the rare earth element doped fiber. Therefore, it is possible to achieve an effect in that the positions to which the pumping lights are input can be designed so that the output efficiency represented by "the input pumping light power to the output signal light power" becomes the highest.

Next, the description will be made on application examples for the case where the pumping lights are added in the optical amplifier according to the present invention.

Figure 24:
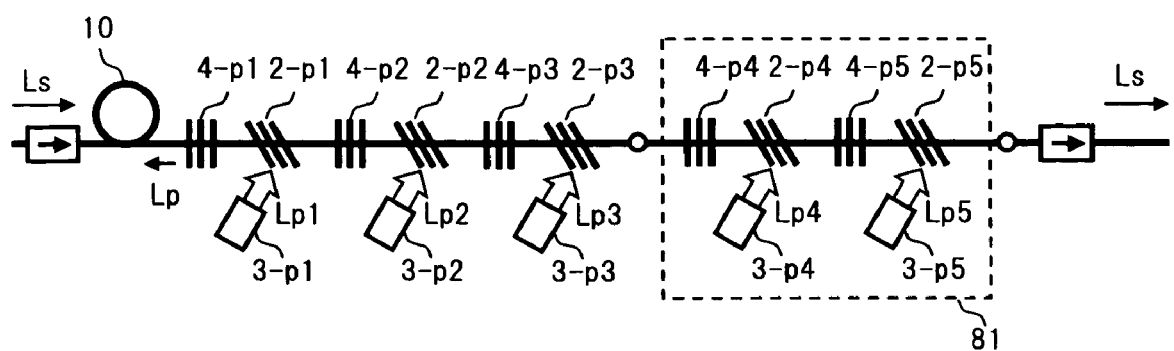
FIG. 24 is a diagram showing a configuration example corresponding to the addition of pumping lights in the optical amplifier of the present invention.
Figure 25:
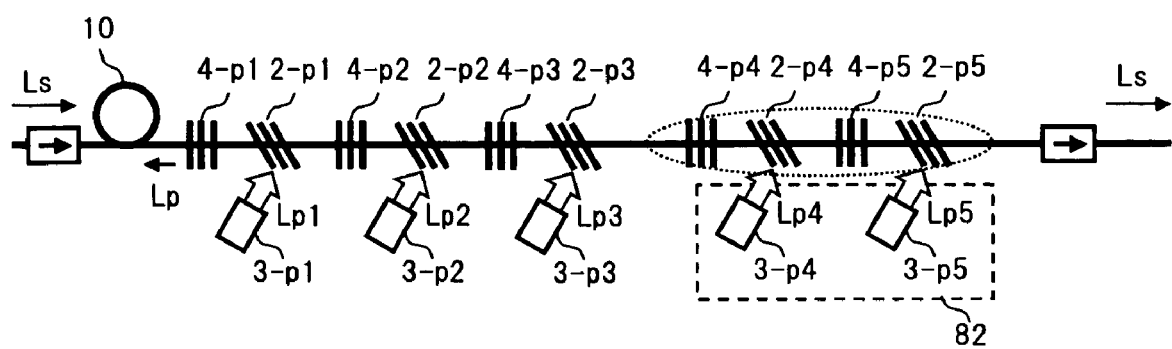
FIG. 25 is a diagram showing another configuration example corresponding to the addition of pumping lights in the optical amplifier of the present invention.
Figure 26:
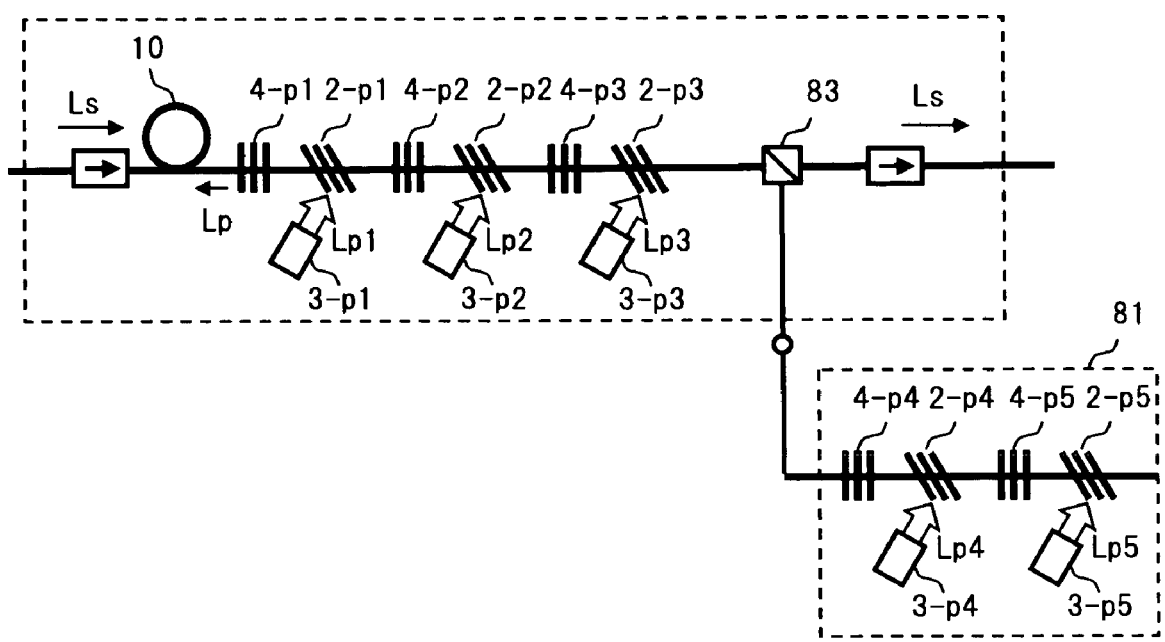
FIG. 26 is a diagram showing a further configuration example corresponding to the addition of pumping lights in the optical amplifier of the present invention.

FIG. 24 to FIG. 26 are diagrams showing configuration examples corresponding to the addition of pumping lights in the above optical amplifier.

In each of the configuration examples of FIG. 24 to FIG. 26, as the pumping light multiplexing system prior to the addition of pumping lights, the tilted FBGs 2-p1 to 2-p3 and the low reflective FBGs 4-p1 to 4-p3 are formed on the amplification medium 10, and the pumping light sources 3-p1 to 3-p3 irradiating the pumping lights Lp1 to Lp3 to the tilted FBGs 2-p1 to 2-p3 are provided. In the case where, for example, the pumping lights Lp4 and Lp5 of the wavelengths $\lambda p4$ and $\lambda p5$ are added in the optical amplifier provided with such a pumping light multiplexing system, in the configuration example of FIG. 24, there is prepared an expanded section 81 which includes the tilted FBGs 2-p4 and 2-p5 and the low reflective FBGs 4-p4 and 4-p5 formed on an optical fiber different from the amplification medium 10, and the pumping light sources 3-p4 and 3-p5. Both ends of the optical fiber in the expanded section 81 are connected to the amplification medium 10 using a fusion splicer, an optical connector or the like. Further, in the configuration example of FIG. 25, the tilted FBGs 2-p4 and 2-p5 and the low reflective FBGs 4-p4 and 4-p5 are formed on the amplification medium 10, in preparation for the addition of pumping lights, and then an expanded section 82 including the pumping light sources 3-p4 and 3-p5 is disposed on a predetermined position. Moreover, in the configuration example of FIG. 26, an optical multiplexer 83 for the addition of pumping lights, is previously formed on the amplification medium 10, and then the one end of the optical fiber in the expanded section 81 having the same configuration as that in FIG. 24 is connected to a multiplexing port of the optical multiplexer 83 using the fusion splicer, the optical connector or the like.

By adding the pumping lights using the expanded sections of unit type to which the present invention is applied, the optical amplifier is able to have functions of increasing optical power and upgrading the signal band expansion, and also it becomes possible to achieve the reduction of initial installation cost of the optical amplifier. According to a method of adding the pumping lights in the conventional optical amplifier, since it is necessary to increase the dielectric multi-layer films and the like which multiplex the pumping lights, with an increase of the number of wavelengths of the pumping lights, and it is also necessary that the multiplexer, which satisfies the final configuration, is already inserted at the time of initial installation, an insertion loss of the pumping light is increased. On the other hand, the method of adding the pumping lights in the present invention is a simple method in which the pumping light sources of the wavelengths required for the upgrade are added if necessary, and therefore, the initial installation cost can be reduced effectively.

Figure 27:
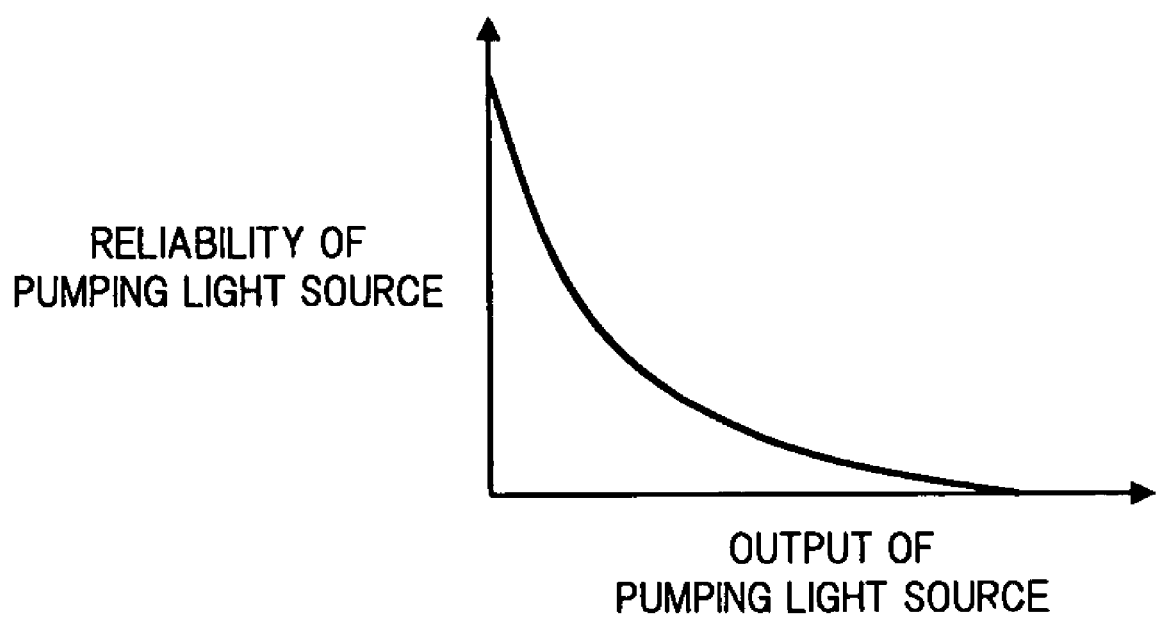
FIG. 27 is a diagram for explaining the reliability improvement and an effect of cost reduction due to a drop of output power of a single pumping light source in the optical amplifier.

For example, in an erbium doped fiber amplifier (EDFA), which is one of rare earth element doped fiber amplifiers, 660 nm, 820 nm, 980 nm and 1480 nm can be considered as the pumping wavelength. In the present invention, it is possible to cope with an arbitrary pumping wavelength by designing the reflective wavelength characteristics of the tilted FBG and the low reflective FBG according to a desired pumping wavelength, and also, it becomes possible to increase the number of wavelength division multiplexed pumping lights for when the pumping lights of plural wavelengths are used, by designing the reflective wavelength characteristic of the low reflective FBG to be of the narrow band, thereby enabling the increase of the number of pumping light sources. As the merits of the increase of the number of pumping light sources, there are the improvement of reliability of the optical amplifier due to the reduction of output power from the single pumping light source as shown in FIG. 27 for example, that is, the possibility of retardant configuration of the pumping light source, and the like. Further, in the case of the Raman amplifier, it becomes possible to improve the wavelength flatness of output power due to the increase of the number of pumping light sources.

Figure 28:
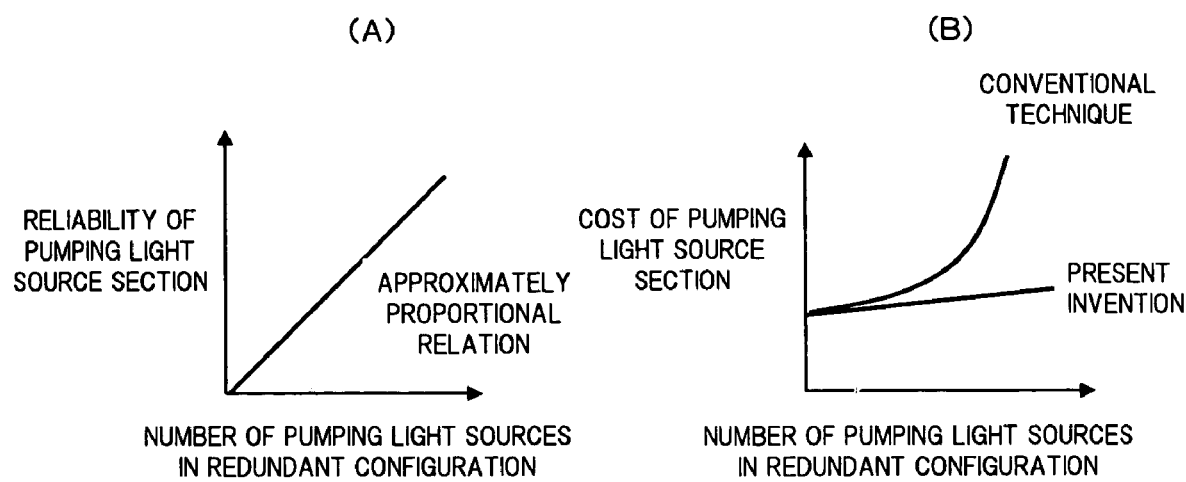
FIG. 28 is a diagram for explaining a relationship between the number of pumping light sources in the optical amplifier, and the reliability and cost.

The effects due to the present invention described above will be described more specifically. For example, in the case where the erbium doped fiber is adopted as the amplification medium 10, it is considered that a low cost semiconductor laser (0.5 µm band, 0.6 µm band or 0.8 µm band of oscillation wavelength) for commercial-off-the-shelf to be used for DVD, CD-R or the like is utilized as the pumping light source. However, the commercial-off-the-shelf semiconductor laser has the less reliability when used for the communication. As one of methods for improving the reliability of the pumping light source, there is a retardant configuration method. This retardant configuration method is the one for improving the reliability to a predetermined level by adopting a large number of pumping light sources although such a pumping light source has less reliability when used in a simple body, and the number of pumping light sources and the reliability are in a proportional relation as shown in (A) of FIG. 28. In the case where the retardant configuration is adopted in the conventional optical amplifier, even if the unit cost of the pumping light source is low, the component cost and the assembly cost of the pumping light multiplexing system for achieving the retardant configuration become high, and consequently, it is impossible to expect the cost reduction of the optical amplifier as a whole as shown in (B) of FIG. 28. Further, with the increase of the number of pumping light sources, the increase of output power of a single pumping light source is brought due to the increase of insertion loss of the pumping light multiplexing system. On the other hand, in the optical amplifier of the present invention, since a ratio of the cost increase to the number of pumping light sources is low as described in the above, the present invention is effective for solving the conventional problems.

Figure 29:
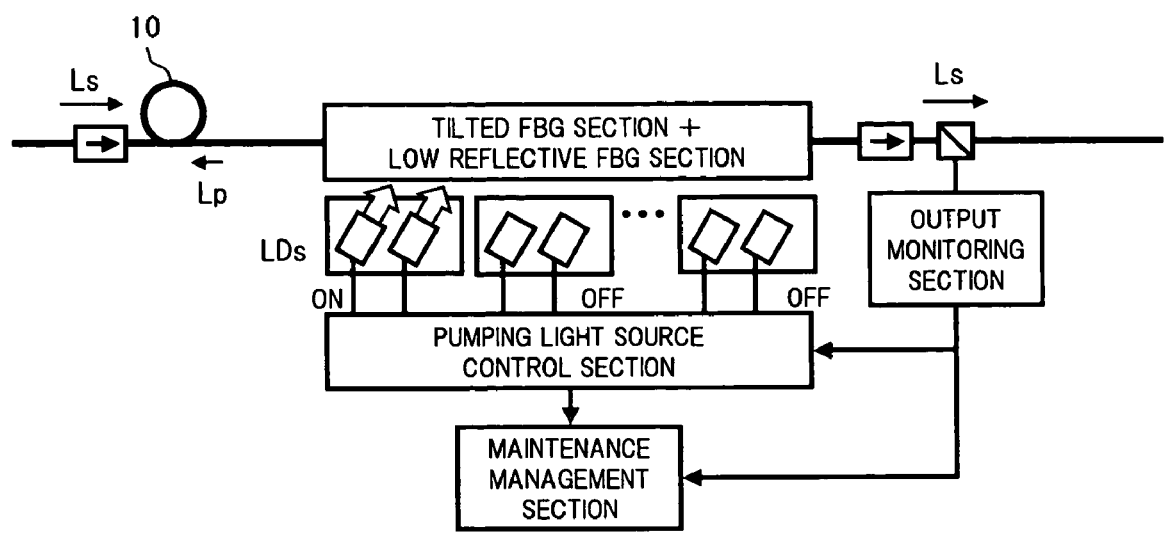
FIG. 29 is a diagram showing a specific example in which a retardant configuration of pumping light source is realized by applying the present invention.

FIG. 29 is a specific example in which, when the commercial-off-the-shelf semiconductor laser is used as the pumping light source to achieve the cost reduction of the optical amplifier, the retardant configuration of the pumping light source is realized by applying the pumping light multiplexing system of the present invention, to ensure the reliability of the semiconductor laser when used for the communication. In this specific example, two pumping light sources are accommodated in one cassette, and the retardant configuration is formed by a plurality of cassettes. Then, an operation state of the active cassette and an output state of the signal light are monitored, and the deterioration of the pumping light sources is detected based on the monitoring result, so that the switching to the next cassette is autonomously controlled by a maintenance management section. As a result, it becomes possible to realize an extremely low cost EDFA ensuring the reliability when used for the communication.

Figure 30:
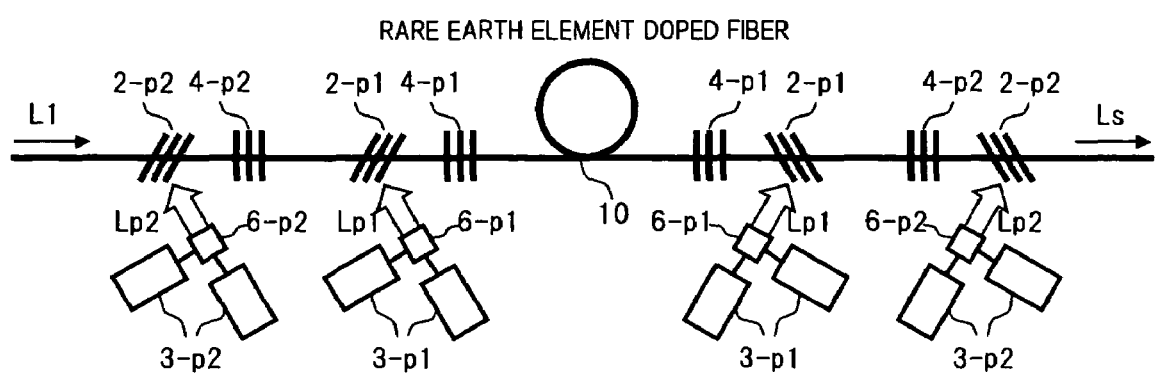
FIG. 30 is a diagram showing one example in the case where the configuration of FIG. 14 is applied to a rare earth element doped fiber amplifier of bi-directional pumping.
Figure 31:
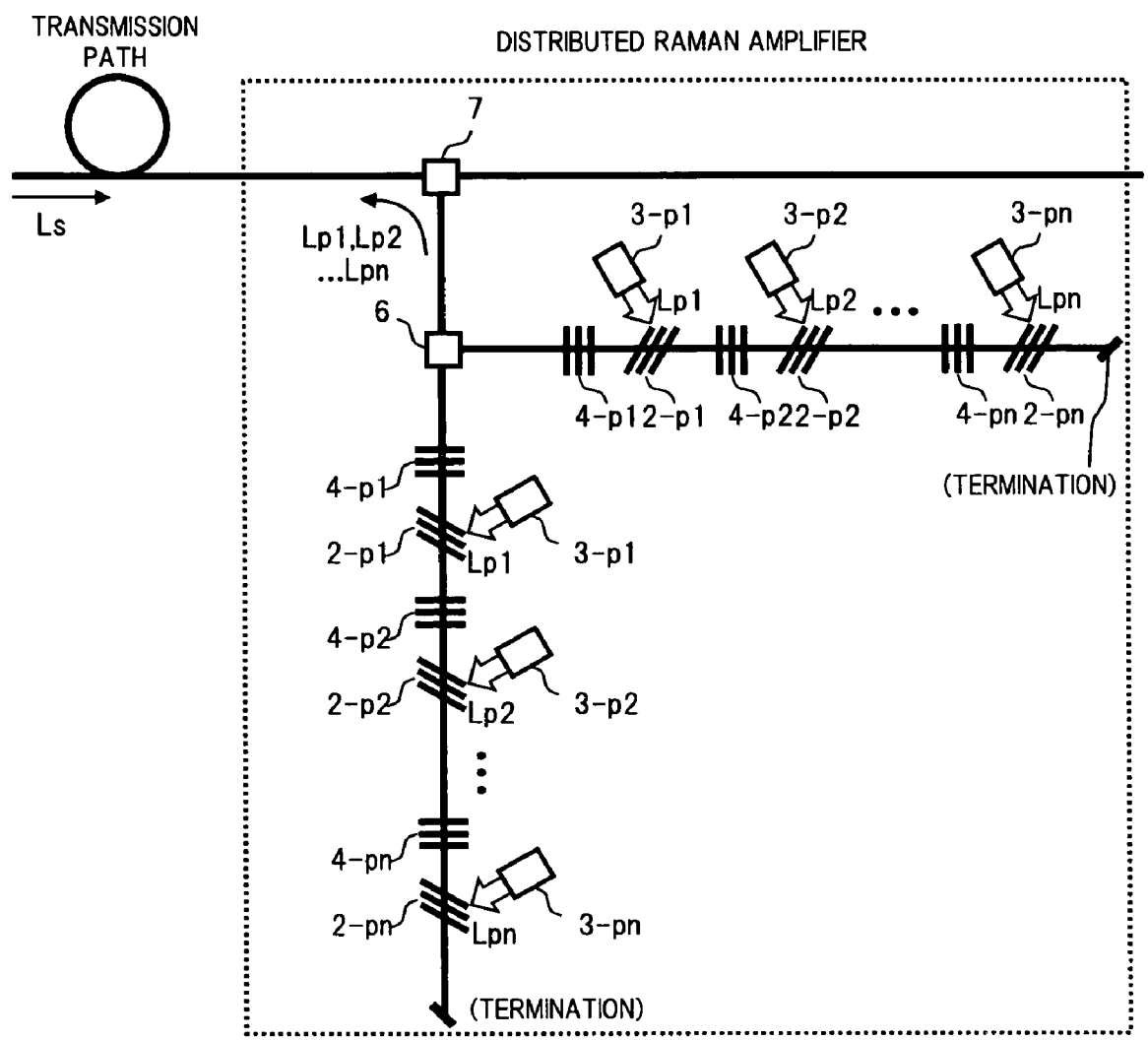
FIG. 31 is a diagram showing one example in the case where the configuration of FIG. 15 is applied to a distributed Raman amplifier.

In the above description relating to the embodiment of the optical amplifier according to the present invention, the configuration has been exemplarily shown in which the light emitted from one pumping light source is directly irradiated to the tilted FBG. However, it is surely possible to adopt, as the pumping light multiplexing system of the optical amplifier, a configuration in which the lights in different polarization states emitted from two pumping light sources as shown in FIG. 14 or FIG. 15 are combined using the polarization combining device. To be specific, one example in the case where this configuration is applied to a bi-directional pumping rare earth element doped fiber amplifier is shown in FIG. 30, and further, one example in the case where this configuration is applied to the distributed Raman amplifier is shown in FIG. 31.

Next, the description will be made on an application example of the optical amplifier according to the present invention, for achieving the further reduction of initial installation cost and the expansion of amplification band.

Generally, in the optical amplifier applied to a large capacity wavelength division multiplexing communication system, a problem is how the expansion of amplification band in a single band is realized at the low cost. For example, in the rare earth element doped fiber amplifier, the Raman amplifier or the like, there is a problem of cost increase caused by the fact that a large gain peak exists in a particular band, and the pumping light power is excessively consumed by an excess gain. To such a problem, there has been conventionally proposed a technique for achieving the reduction of required pumping light power by providing means for suppressing the excess gain (refer to Japanese Unexamined Patent Publication No. 3-263889 and Japanese Unexamined Patent Publication No. 6-342175). However, according to such a conventional technique, the means for suppressing the excess gain may be a factor increasing a background loss of the signal band, and therefore, there remains a problem of the reduction of amplification efficiency and the deterioration of noise figure.

Therefore, in the following, the description will be made on an effective technique for solving the problem in the expansion of amplification band of the optical amplifier, and also, such an effective technique is combined with the configuration of the pumping light multiplexing system according to the present invention, to achieve the further reduction of the initial installation cost.

Firstly, as means for reducing required pumping light power, suppression means for selectively suppressing the excess gain in a partial band within the signal band are distributingly provided in the longitudinal direction of the amplification medium. This suppression means has a feature to select the wavelength band having a relatively large gain to suppress the excess gain, and has a wavelength characteristic of a simple shape (for example, Gaussian or the like) having for example, the half band of about 30% of the signal light band. Further, in a method of forming the suppressing means in the longitudinal direction of the amplification medium, the suppression means are not formed closely, but are formed basically at approximately even intervals, for example, at intervals of about 10% of the total length of amplification medium.

As described above, the suppressing means are not formed closely but are formed basically at approximately even intervals in the longitudinal direction of the amplification medium. As a result, it becomes possible to achieve an advantage of the distributed suppression method, namely, the improvement of amplification efficiency and noise figure. Further, since the configuration is such that the number of portions on which the suppressing means are formed is reduced (the suppressing means are formed at intervals of 10% of the total length of amplification medium) and a suppression amount by each suppression means is made relatively large, it becomes possible to achieve the further improvement of amplification efficiency while suppressing the deterioration of noise figure. However, if the number of portions on which the suppression means are formed is too reduced or the suppression means are formed closely, it will be understood that an excessively grown light is concentratively suppressed at a certain fixed position, and the advantage of the distributed suppression method is impaired, thereby increasing the required pumping light power.

Figure 32:
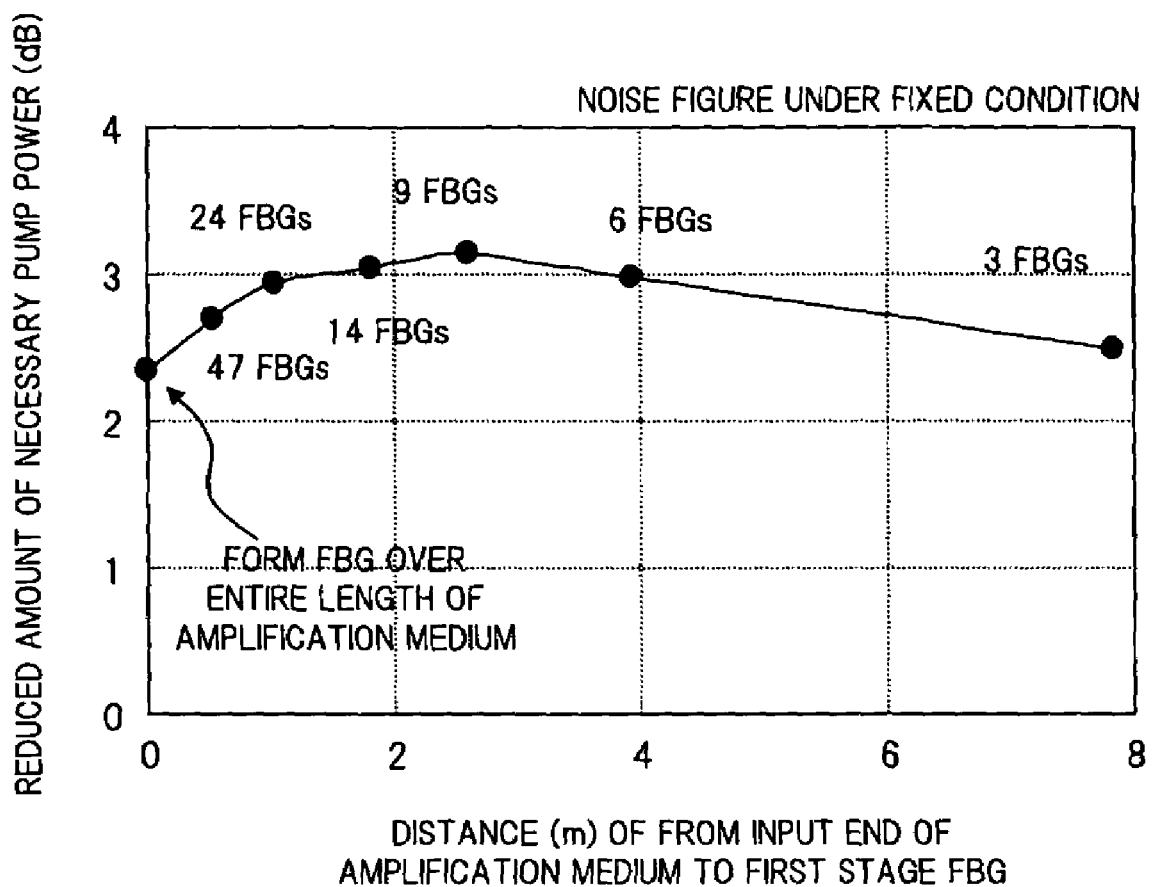
FIG. 32 is a diagram showing a change in pumping light power improved amount in the case where FBGs suppressing excess gains are formed on the amplification medium at fixed intervals in the optical amplifier of the present invention.
Figure 33:
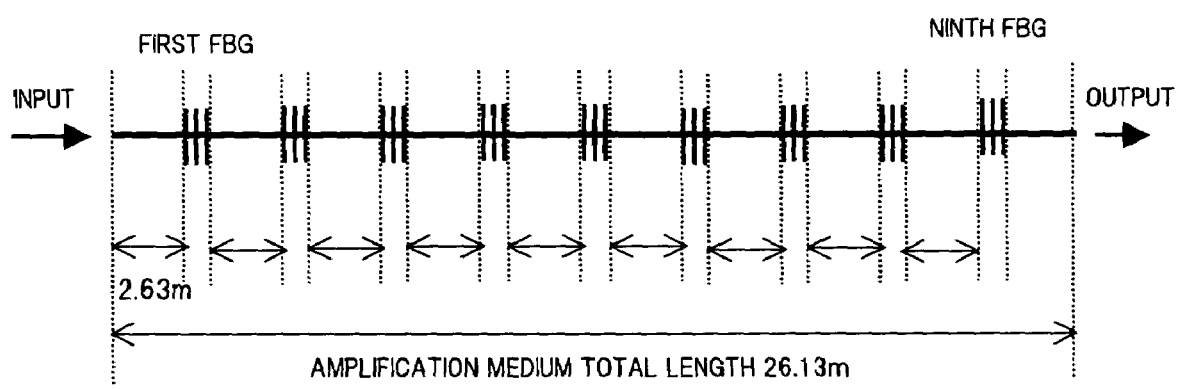
FIG. 33 is a diagram showing an arrangement image of FBGs for when the pumping light improved amount becomes a maximum.

Specifically considering the state in, which the suppression means are formed in the longitudinal direction of amplification medium, for example in the case where the FBGs as the suppression means are formed at constant intervals on the amplification medium having the total length of 26.13 m, an improved amount of the required pumping light power is changed depending on the distance of from the input end of the amplification medium to the first stage FBG (corresponding to the formation interval of each stage FBG) as exemplarily shown in FIG. 32. In the relationship shown in FIG. 32, it is understood that the improved amount of the required pumping light power becomes maximum when the FBGs are arranged on nine portions on the amplification medium at 2.63 m intervals. FIG. 33 shows an image of FBG arrangement on the amplification medium in the above case.

It is desirable to adopt a method capable of reducing the manufacturing cost as a method of forming the suppression means (here FBGs) in the longitudinal direction of amplification medium. To be specific, for example, a method in which the amplification medium (for example, the rare earth element doped fiber, the Raman amplification fiber or the like) is wound around a member having a large diameter, and a rotation speed and rotation timing of the member are controlled synchronously with timing of irradiating the ultra-violet ray for forming the FBGs, may be adopted. Further, for example, a method in which the amplification medium is wound around the member according to the number of FBGs to be formed, and the diameter of the member is determined so that the positions on which the FBGs are formed are arranged on one location, thereby enabling to form a large number of FBGs with one time irradiation of ultra-violet ray, may be adopted.

Figure 34:
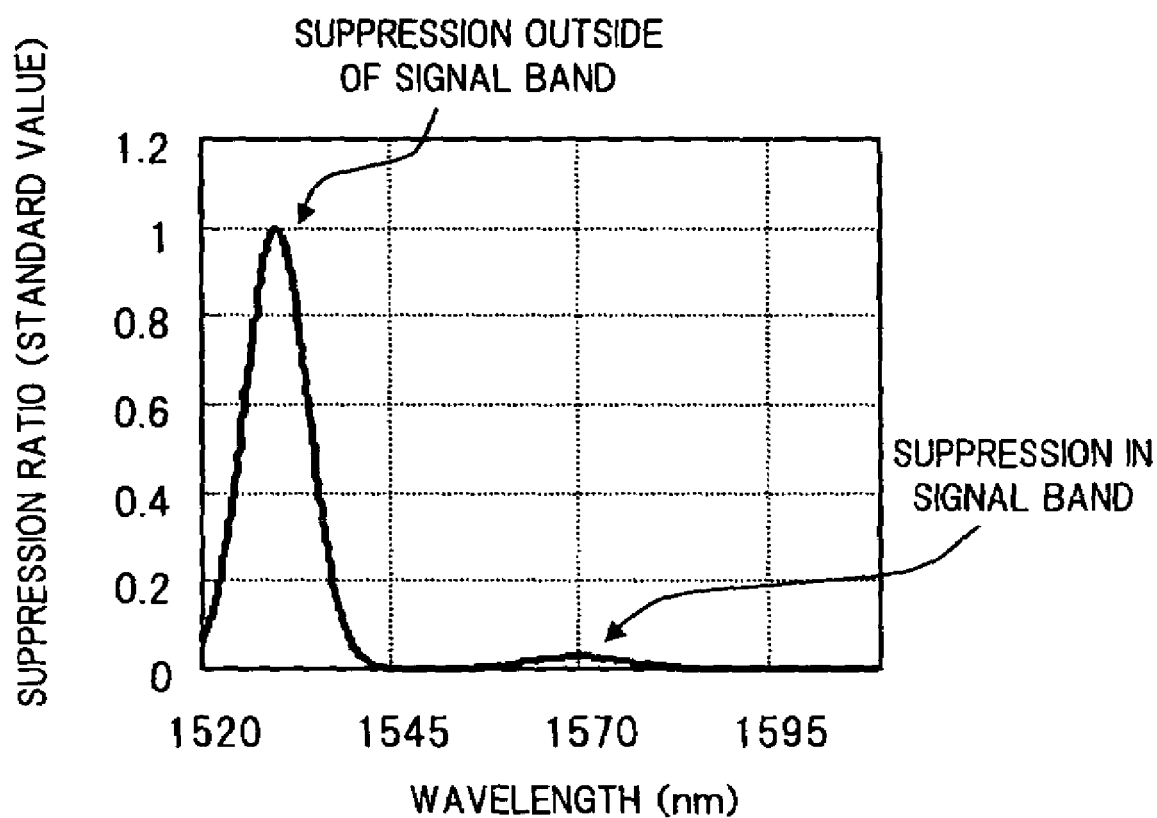
FIG. 34 is a diagram showing a suppression ratio to the wavelength in the case where there is provided means for selectively suppressing an amplified spontaneous emission light in a particular band outside a signal band in the optical amplifier of the present invention.

Moreover, in addition to the formation of the FBGs in the longitudinal direction of amplification medium described above, means for selectively suppressing an amplified spontaneous emission light in a particular band outside the signal band may also be distributedly formed in the longitudinal direction of the same amplification medium. Thus, a noise light generated outside the signal band is effectively suppressed as shown in FIG. 34 for example. Therefore, it becomes possible to achieve an effect of further reduction of noise figure and an effect of improvement of pumping efficiency.

Figure 35:
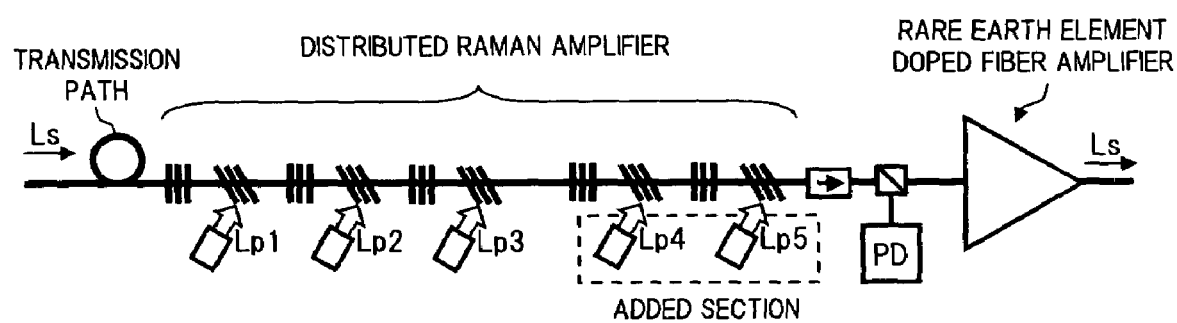
FIG. 35 is a diagram showing a hybrid configuration in which the distributed Raman amplifier applied with the configuration of FIG. 25 is combined with the rare earth element doped fiber amplifier achieving the amplification band expansion of a single band.

Consequently, by combining the technique for reducing the required pumping light power as described above with the pumping light multiplexing system utilizing the above tilted FBGs and the like, it becomes possible to realize the optical amplifier in which the initial installation cost is further reduced. As a specific example of such an optical amplifier, FIG. 35 shows an optical amplifier of hybrid configuration in which the distributed Raman amplifier to which the configuration shown in FIG. 25 is applied, and the rare earth element doped fiber amplifier achieving the reduction of required pumping light power, are connected in serial.

What is claimed is:
1. An optical multiplexer, in which a first light being propagated through an optical fiber is multiplexed with a second light having a wavelength different from that of said first light, comprising:
   a first fiber Bragg grating, which has transmission wavelength characteristics to transmit said first light and to reflect said second light, and is formed on said optical fiber with a grating direction thereof being tilted to an axial direction of said optical fiber;
   a light source irradiating lights containing a wavelength component of said second light to said first fiber Bragg grating from an angle direction determined according to a grating pitch of said first fiber Bragg grating and the wavelength of said second light; and
   a second fiber Bragg grating, which has the reflectance lower than the reflectance of said first fiber Bragg grating relative to said second light and has a grating plane perpendicular to the axial direction of said optical fiber, and is formed on said optical fiber on the side where said second light irradiated from said light source to said first fiber Bragg grating and coupled within said optical fiber is propagated, wherein said second light is resonated between said light source and said second fiber Bragg grating via said first fiber Bragg grating; and
wherein said light source irradiates a light obtained by polarizingly combining a plurality of lights in different polarization states to said first fiber Bragg grating.

2. An optical multiplexer according to claim 1,
wherein said first fiber Bragg grating has the reflectance of approximately 100% to said second light, and said second fiber Bragg grating has a narrow band reflection spectrum characteristic in which the reflectance is sharply changed in the wavelength of said second light.

3. An optical multiplexer according to claim 1,
wherein said first fiber Bragg grating is applied with a chirped configuration in which the grating pitch is gradually changed along the axial direction of the optical fiber.

4. An optical multiplexer according to claim 1, further comprising;
means for approximating an electric field distribution of an emitted beam from said light source and an electric field distribution of said second light which is incident and emitted on and from said first fiber Bragg grating, to enhance the coupling efficiency of said second light.

5. An optical multiplexer according to claim 4,
wherein said means for enhancing the coupling efficiency of said second light optimizes the designing of an optical system between said light source and said first fiber Bragg grating.

6. An optical multiplexer according to claim 4,
wherein said means for enhancing the coupling efficiency of said second light optimizes the parameter designing of said first fiber Bragg grating.

7. An optical multiplexer according to claim 1,
wherein when a plurality of lights of wavelengths different from that of said first light is multiplexed with said first light being propagated through said optical fiber,
a plurality of said first fiber Bragg gratings and a plurality of said second fiber Bragg gratings are disposed corresponding to said plurality of lights, and said first fiber Bragg gratings and said second fiber Bragg gratings are tandem arranged on said optical fiber, and
a plurality of said light sources is disposed corresponding to said plurality of lights, and respective lights emitted from said plurality of said light sources are irradiated to said tandem arranged first fiber Bragg gratings, respectively.

8. An optical multiplexer according to claim 1,
wherein when a plurality of lights of wavelengths different from that of said first light is multiplexed with said first light being propagated through said optical fiber,
said first fiber Bragg grating is applied with a chirped configuration in which the grating pitch is gradually changed along the axial direction of the optical fiber, to have a reflection band containing the wavelengths of said plurality of lights,
a plurality of said second fiber Bragg gratings is disposed corresponding to said plurality of lights, to be tandem arranged on said optical fiber, and
a plurality of said light sources are disposed corresponding to said plurality of lights, and said respective light sources are arranged on positions determined according to the light collection performance of said first fiber Bragg grating to which the chirped configuration is applied.

9. An optical amplifier, in which supplies a pumping light to an amplification medium, to perform the optical amplification on a signal light being propagated through said amplification medium, comprising:
a first fiber Bragg grating, which has transmission wavelength characteristics to transmit said signal light and to reflect said pumping light, and is formed on an optical fiber connected to said amplification medium with a grating direction thereof being tilted to an axial direction of said optical fiber;
a pumping light source irradiating lights containing a wavelength component of said pumping light to said first fiber Bragg grating from an angle direction determined according to a grating pitch of said first fiber Bragg grating and the wavelength of said pumping light; and
a second fiber Bragg grating, which has the reflectance lower than the reflectance of said first fiber Bragg grating relative to said pumping light and has a grating plane perpendicular to the axial direction of said optical fiber, and is formed on said optical fiber on the side where said pumping light emitted from said pumping light source, and irradiated to said first fiber Bragg grating and coupled within said optical fiber is propagated,
wherein said pumping light is resonated between said pumping light source and said second fiber Bragg grating via said first fiber Bragg grating.

10. An optical amplifier according to claim 9,
wherein said first fiber Bragg grating has the reflectance of approximately 100% to said pumping light, and said second fiber Bragg grating has a narrow band reflection spectrum characteristic in which the reflectance is sharply changed in the wavelength of said pumping light.

11. An optical amplifier according to claim 9,
wherein said first fiber Bragg grating is applied with a chirped configuration in which the grating pitch is gradually changed along the axial direction of the optical fiber.

12. An optical amplifier according to claim 9, further comprising;
means for approximating an electric field distribution of an emitted beam from said pumping light source and an electric field distribution of said pumping light which is incident and emitted on and from said first fiber Bragg grating, to enhance the coupling efficiency of said pumping light.

13. An optical amplifier according to claim 9,
wherein when a plurality of pumping lights of different wavelengths is supplied to said amplification medium,
a plurality of said first fiber Bragg gratings and a plurality of said second fiber Bragg gratings are disposed corresponding to said plurality of pumping lights, and said first fiber Bragg gratings and said second fiber Bragg gratings are tandem arranged on said optical fiber, and
a plurality of said pumping light sources is disposed corresponding to said plurality of pumping lights, and respective pumping lights emitted from said pumping light sources are irradiated to said tandem arranged first fiber Bragg gratings, respectively.

14. An optical amplifier according to claim 9,
wherein when a plurality of pumping lights of different wavelengths is supplied to said amplification medium,
said first fiber Bragg grating is applied with a chirped configuration in which the grating pitch is gradually changed along the axial direction of the optical fiber, to have a reflection band containing the wavelengths of said plurality of pumping lights, a plurality of said second fiber Bragg gratings is disposed corresponding to said plurality of pumping lights, to be tandem arranged on said optical fiber, and a plurality of said pumping light sources is disposed corresponding to said plurality of pumping lights, and said respective pumping light sources are arranged on positions determined according to the light collection performance of said first fiber Bragg grating to which the chirped configuration is applied.

15. An optical amplifier according to claim 9, wherein said pumping light source irradiates a light obtained by polarizingly combining a plurality of lights in different polarization states to said first fiber Bragg grating.

16. An optical amplifier according to claim 9, wherein said first and second fiber Bragg gratings are formed, respectively, on said amplification medium itself.

17. An optical amplifier according to claim 9, wherein said amplification medium is an erbium doped fiber, and said pumping light source is a semiconductor laser with an oscillation wavelength of 0.5 μm band, 0.6 μm band or 0.8 μm band.

18. An optical amplifier according to claim 9, wherein suppression means for selectively suppressing an excess gain in at least a partial band within a wavelength band of said signal light, are distributingly provided in a longitudinal direction of said amplification medium.

19. An optical amplifier according to claim 18, wherein said suppression means has a suppressing wavelength characteristic capable of suppressing the growth of signal light power in said partial band caused with the propagation of said signal light in the longitudinal direction of said amplification medium, to enhance the amplification efficiency in the signal light wavelength band compared with the case where the growth of signal light power is not suppressed, and also to reduce noise figure.

20. An optical amplifier according to claim 18, wherein said suppression means selectively suppresses the growth of signal light power in a band outside the signal light wavelength band, using a suppression amount larger than that in the signal band.

\* \* \* \* \*